United States Patent
Kawai et al.

(10) Patent No.: US 11,184,535 B2
(45) Date of Patent: Nov. 23, 2021

(54) IMAGING ELEMENT, IMAGING APPARATUS, IMAGE DATA PROCESSING METHOD, AND PROGRAM FOR REDUCING POWER CONSUMPTION

(71) Applicant: FUJIFILM CORPORATION, Tokyo (JP)

(72) Inventors: Tomoyuki Kawai, Saitama (JP); Ryo Hasegawa, Saitama (JP); Hitoshi Sakurabu, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/180,889

(22) Filed: Feb. 22, 2021

(65) Prior Publication Data

US 2021/0176406 A1   Jun. 10, 2021

Related U.S. Application Data

(63) Continuation of application No. PCT/JP2019/025647, filed on Jun. 27, 2019.

(30) Foreign Application Priority Data

Aug. 31, 2018 (JP) .............................. JP2018-163997

(51) Int. Cl.
*H04N 5/232* (2006.01)
*H04N 1/41* (2006.01)
*H04N 5/235* (2006.01)

(52) U.S. Cl.
CPC ......... *H04N 5/232411* (2018.08); *H04N 1/41* (2013.01); *H04N 5/2353* (2013.01); *H04N 5/23229* (2013.01)

(58) Field of Classification Search
CPC ............... H04N 5/232411; H04N 1/41; H04N 5/23229; H04N 5/2353; H04N 1/4172; H04N 5/378
See application file for complete search history.

(56) References Cited

U.S. PATENT DOCUMENTS

| | | | | |
|---|---|---|---|---|
| 5,412,741 A | * | 5/1995 | Shapiro | H03M 7/30 382/232 |
| 7,421,132 B2 | * | 9/2008 | Okada | H04N 19/60 375/E7.139 |

(Continued)

FOREIGN PATENT DOCUMENTS

| | | |
|---|---|---|
| JP | H06-204891 A | 7/1994 |
| JP | 2005-191939 A | 7/2005 |

(Continued)

OTHER PUBLICATIONS

International Search Report issued in International Application No. PCT/JP2019/025647 dated Sep. 3, 2019.

(Continued)

*Primary Examiner* — Luong T Nguyen
(74) *Attorney, Agent, or Firm* — Solaris Intellectual Property Group, PLLC

(57) ABSTRACT

An imaging element includes a memory that stores captured image data obtained by imaging a subject at a first frame rate and is incorporated in the imaging element, a imaging processing circuit that performs processing on the captured image data, and an output circuit that outputs at least one of the captured image data or processed image data to an outside of the imaging element, and is incorporated in the imaging element, in which the imaging processing circuit generates, in accordance with a degree of difference between first captured image data obtained by imaging and second captured image data stored in the memory, compressed image data obtained by compressing the first captured image (Continued)

data by dividing the first captured image data into a plurality of bit ranges, and the output circuit outputs the compressed image data to the outside as the processed image data at a second frame rate.

18 Claims, 22 Drawing Sheets

(56) References Cited

U.S. PATENT DOCUMENTS

| | | | |
|---|---|---|---|
| 8,705,635 B2 * | 4/2014 | Lee | H04N 19/103 |
| | | | 375/253 |
| 8,879,858 B1 * | 11/2014 | Mobbs | H04N 5/232 |
| | | | 382/232 |
| 9,906,753 B2 * | 2/2018 | Nakajima | H04N 5/77 |
| 2005/0141772 A1 | 6/2005 | Okada | |
| 2016/0381319 A1 | 12/2016 | Nakajima et al. | |

FOREIGN PATENT DOCUMENTS

| | | |
|---|---|---|
| JP | 2007-27848 A | 2/2007 |
| JP | 2015-136093 A | 7/2015 |

OTHER PUBLICATIONS

Written Opinion of the ISA issued in International Application No. PCT/JP2019/025647 dated Sep. 3, 2019.

* cited by examiner

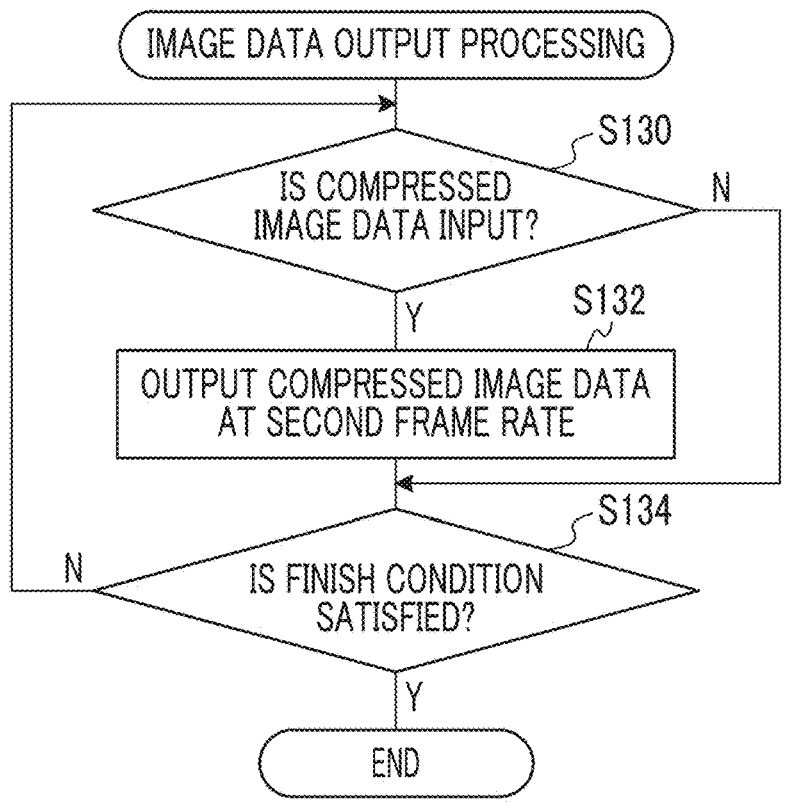
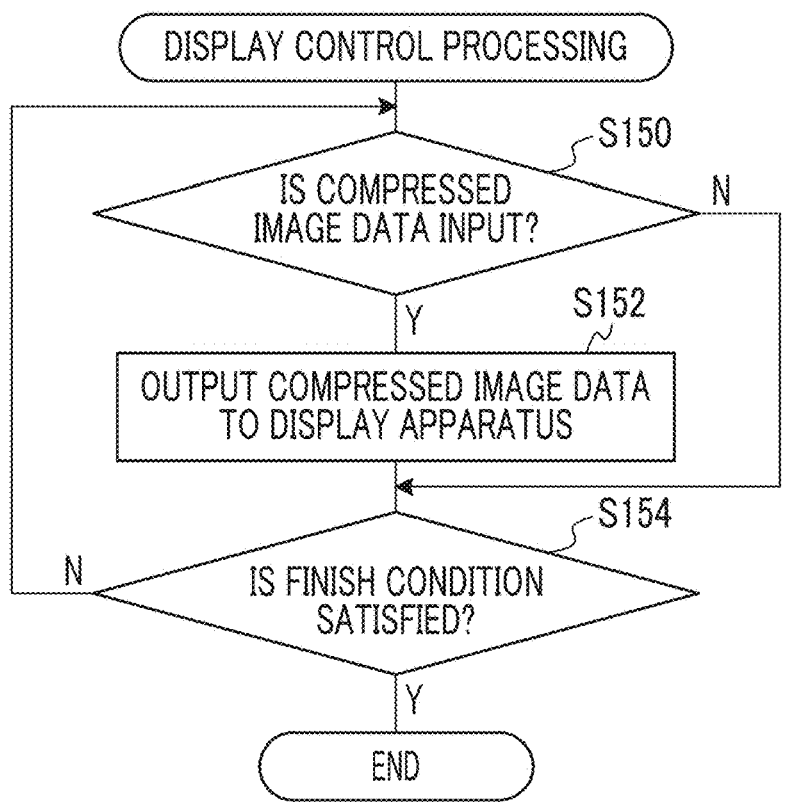

Dn | 11 | 10 | 9 | 8 | 7 | 6 | 5 | 4 | 3 | 2 | 1 | 0 |

Dp | 11 | 10 | 9 | 8 | 7 | 6 | 5 | 4 | 3 | 2 | 1 | 0 |

XOR Dn, Dp

IN CASE OF n = 5, ACQUIRE AND OF RESULT OF ABOVE XOR AND DATA BELOW
| 1 | 1 | 1 | 1 | 1 | 0 | 0 | 0 | 0 | 0 | 0 | 0 |

IN CASE OF RESULT OF AND ≠ 0, HIGH-ORDER [11:5] OF Dn → [6:0] OF Do
| 6 | 5 | 4 | 3 | 2 | 1 | 0 |

IN CASE OF RESULT OF AND = 0, LOW-ORDER [6:0] OF Dn → [6:0] OF Do
| 6 | 5 | 4 | 3 | 2 | 1 | 0 |

FIG. 11

IN CASE OF 16 bits → 9 bits, a = 16 AND b = 9 AND THUS, n = 16 − 9 = 7

| 15 | 14 | 13 | 12 | 11 | 10 | 9 | 8 | 7 | 6 | 5 | 4 | 3 | 2 | 1 | 0 |

COMPARED HIGH-ORDER BITS WITH n = 7

| 1 | 1 | 1 | 1 | 1 | 1 | 1 | 0 | 0 | 0 | 0 | 0 | 0 | 0 | 0 | 0 |

IN CASE OF 14 bits → 7 bits, a = 14 AND b = 7 AND THUS, n = 14 − 7 = 7

| 13 | 12 | 11 | 10 | 9 | 8 | 7 | 6 | 5 | 4 | 3 | 2 | 1 | 0 |

COMPARED HIGH-ORDER BITS WITH n = 7

| 1 | 1 | 1 | 1 | 1 | 1 | 1 | 0 | 0 | 0 | 0 | 0 | 0 | 0 |

IN CASE OF 12 bits → 7 bits, a = 12 AND b = 7 AND THUS, n = 12 − 7 = 5

| 11 | 10 | 9 | 8 | 7 | 6 | 5 | 4 | 3 | 2 | 1 | 0 |

COMPARED HIGH-ORDER BITS WITH n = 5

| 1 | 1 | 1 | 1 | 1 | 0 | 0 | 0 | 0 | 0 | 0 | 0 |

IN CASE OF 10 bits → 6 bits, a = 10 AND b = 6 AND THUS, n = 10 − 6 = 4

| 9 | 8 | 7 | 6 | 5 | 4 | 3 | 2 | 1 | 0 |

COMPARED HIGH-ORDER BITS WITH n = 4

| 1 | 1 | 1 | 1 | 0 | 0 | 0 | 0 | 0 | 0 |

FIG. 17

HIGH-ORDER [11:5] OF Dn → [6:0] OF Do[x, y], AND SET [7] OF Do TO 1

Do | 1 | | | | | | |

LOW-ORDER [6:0] OF Dn → [6:0] OF Do[x, y], AND SET [7] OF Do TO 0

Do | 0 | | | | | | |

IMAGING ELEMENT, IMAGING APPARATUS, IMAGE DATA PROCESSING METHOD, AND PROGRAM FOR REDUCING POWER CONSUMPTION

CROSS-REFERENCE TO RELATED APPLICATIONS

This application is a continuation application of International Application No. PCT/JP2019/025647, filed Jun. 27, 2019, the disclosure of which is incorporated herein by reference in its entirety. Further, this application claims priority from Japanese Patent Application No. 2018-163997, filed Aug. 31, 2018, the disclosure of which is incorporated by reference herein.

BACKGROUND

1. Technical Field

The technology of the present disclosure relates to an imaging element, an imaging apparatus, an image data processing method, and a program.

2. Related Art

JP1994-204891A (JP-H6-204891A) discloses a data compression method using a run-length code. In the data compression method disclosed in JP1994-204891A (JP-H6-204891A), first, difference data consisting of a bit string in which matching is denoted by "0" and non-matching is denoted by "1" is obtained by comparing sequentially input two consecutive pieces of data of image data of L bits in units of bits. Next, the number of consecutive "0"s from a high-order bit of the difference data is obtained and is converted into a run-length code of a bit width of W=["$\log_2$ L"+1] (" " is Gauss notation). The run-length code to which low-order bits of the difference data excluding the number of consecutive "0"s+1 bits are appended is output as compressed data.

SUMMARY

One embodiment of the present invention provides an imaging element, an imaging apparatus, an image data processing method, and a program capable of reducing power consumption accompanied by outputting image data to an outside of the imaging element, compared to a case where image data obtained by imaging is output to the outside of the imaging element.

A first aspect according to the technology of the present disclosure is an imaging element comprising a storage portion that stores captured image data obtained by imaging a subject at a first frame rate and is incorporated in the imaging element, a processing portion that performs processing on the captured image data and is incorporated in the imaging element, and an output portion that outputs at least one of the captured image data or processed image data obtained by performing the processing on the captured image data to an outside of the imaging element, and is incorporated in the imaging element, in which the processing portion generates, in accordance with a degree of difference between first captured image data obtained by imaging and second captured image data stored in the storage portion, compressed image data obtained by compressing the first captured image data by dividing the first captured image data into a plurality of bit ranges, and the output portion outputs the compressed image data generated by the processing portion to the outside as the processed image data at a second frame rate.

Accordingly, the imaging element of the first aspect according to the technology of the present disclosure can reduce power consumption accompanied by outputting image data to the outside of the imaging element, compared to a case where image data obtained by imaging is output to the outside of the imaging element.

A second aspect according to the technology of the present disclosure is the imaging element according to the first aspect, in which the first frame rate is a frame rate higher than the second frame rate.

Accordingly, the imaging element of the second aspect according to the technology of the present disclosure can generate the compressed image data more quickly than in a case where imaging is performed at the same frame rate as a frame rate used for outputting the compressed image data by the output portion.

A third aspect according to the technology of the present disclosure is the imaging element according to the first aspect or the second aspect, in which the second captured image data is image data obtained earlier by more than or equal to one frame than the first captured image data obtained by imaging.

Accordingly, the imaging element of the third aspect according to the technology of the present disclosure can increase the degree of difference, compared to a case where the first captured image data and the second captured image data are image data obtained by imaging at the same time.

A fourth aspect according to the technology of the present disclosure is the imaging element according to any one aspect of the first aspect to the third aspect, in which the degree of difference is a degree of difference between the first captured image data and the second captured image data in units of lines each time the first captured image data is read out in units of lines by the reading portion.

Accordingly, the imaging element of the fourth aspect according to the technology of the present disclosure can output the compressed image data more quickly than in a case where the degree of difference between the first captured image data and the second captured image data is decided after waiting for the first captured image data to be read out in units of frames.

A fifth aspect according to the technology of the present disclosure is the imaging element according to any one aspect of the first aspect to the fourth aspect, in which the degree of difference is a degree of difference in predetermined high-order bit between the first captured image data and the second captured image data.

Accordingly, the imaging element of the fifth aspect according to the technology of the present disclosure can decide the degree of difference between the first captured image data and the second captured image data more quickly than in a case where all bits of the first captured image data and the second captured image data are compared.

A sixth aspect according to the technology of the present disclosure is the imaging element according to the fifth aspect, in which the first captured image data and the second captured image data are image data having the same number of bits, the compressed image data is image data of a second bit less than a first bit that is the number of bits of the first captured image data, and the predetermined high-order bit is a bit corresponding to a value obtained by subtracting the second bit from the first bit.

Accordingly, the imaging element of the sixth aspect according to the technology of the present disclosure can decide the degree of difference between the first captured image data and the second captured image data with higher accuracy than in a case where the degree of difference between the first captured image data and the second captured image data is decided by comparing the first captured image data with the second captured image data in bits not related to the bits of the compressed image data.

A seventh aspect according to the technology of the present disclosure is the imaging element according to any one aspect of the first aspect to the sixth aspect, in which the compressed image data is data based on one piece of bit image data that is decided in accordance with the degree of difference among a plurality of pieces of bit image data obtained by dividing the first captured image data into the plurality of bit ranges.

Accordingly, the imaging element of the seventh aspect according to the technology of the present disclosure can reduce power consumption accompanied by outputting the image data, compared to a case of outputting all bits of the first captured image data.

An eighth aspect according to the technology of the present disclosure is the imaging element according to the seventh aspect, in which the plurality of pieces of bit image data are high-order bit image data and low-order bit image data, and the compressed image data includes data based on the high-order bit image data in a case where the degree of difference satisfies a predetermined condition, and includes data based on the low-order bit image data in a case where the degree of difference does not satisfy the predetermined condition.

Accordingly, the imaging element of the eighth aspect according to the technology of the present disclosure can adjust a degree of suppressing a decrease in image quality and a degree of reducing power consumption in accordance with a motion of the subject, compared to a case where all bits of the first captured image data are output regardless of the motion of the subject.

A ninth aspect according to the technology of the present disclosure is the imaging element according to the seventh aspect or the eighth aspect, in which a bit of a part of the compressed image data is a bit to which bit image specifying information capable of specifying any bit image data on which data of the compressed image data is based among the plurality of pieces of bit image data is assigned.

Accordingly, the imaging element of the ninth aspect according to the technology of the present disclosure can specify any bit image data on which the data of the compressed image data is based among the plurality of pieces of bit image data, more quickly than in a case where the bit image specifying information is output at a timing different from an output timing of the compressed image data.

A tenth aspect according to the technology of the present disclosure is the imaging element according to any one aspect of the first aspect to the ninth aspect, in which the compressed image data is image data in units of lines and includes divided image specifying information capable of specifying any divided image data on which data of the compressed image data is based among a plurality of pieces of divided image data obtained by dividing the first captured image data into the plurality of bit ranges.

Accordingly, the imaging element of the tenth aspect according to the technology of the present disclosure can specify any divided image data on which the data of the compressed image data is based in units of lines.

An eleventh aspect according to the technology of the present disclosure is the imaging element according to any one aspect of the first aspect to the tenth aspect, in which in a case where imaging for a motion picture is started, the output portion outputs the first captured image data to the outside before the second captured image data is stored in the storage portion.

Accordingly, the imaging element of the eleventh aspect according to the technology of the present disclosure can avoid a delay in outputting the image data by the output portion even before the second captured image data is stored in the storage portion.

A twelfth aspect according to the technology of the present disclosure is the imaging element according to any one aspect of the first aspect to the eleventh aspect, in which in a case where imaging for a motion picture is started, the output portion outputs data based on image data belonging to a specific bit range in the first captured image data to the outside before the second captured image data is stored in the storage portion.

Accordingly, the imaging element of the twelfth aspect according to the technology of the present disclosure can reduce power consumption accompanied by outputting the image data, compared to a case where the first captured image data is output before the second captured image data is stored in the storage portion.

A thirteenth aspect according to the technology of the present disclosure is the imaging element according to any one aspect of the first aspect to the twelfth aspect, in which in a case where imaging for a motion picture is started, the output portion outputs substituting compressed image data to the outside in accordance with a degree of difference between the first captured image data and predetermined image data as image data substituting the second captured image data, before the second captured image data is stored in the storage portion, the substituting compressed image data being obtained by compressing the first captured image data by dividing the first captured image data into the plurality of bit ranges.

Accordingly, the imaging element of the thirteenth aspect according to the technology of the present disclosure can reduce power consumption accompanied by outputting the image data, compared to a case where the first captured image data is output before the second captured image data is stored in the storage portion.

A fourteenth aspect according to the technology of the present disclosure is the imaging element according to any one aspect of the first aspect to the thirteenth aspect, in which in a case where imaging for a still picture is consecutively performed at a predetermined time interval, the output portion outputs the first captured image data or image data belonging to a predetermined bit range in the first captured image data to the outside before the second captured image data is stored in the storage portion, and outputs the compressed image data to the outside on a condition that the second captured image data is stored in the storage portion.

Accordingly, the imaging element of the fourteenth aspect according to the technology of the present disclosure can reduce power consumption accompanied by outputting the image data, compared to a case where the first captured image data is output before the second captured image data is stored in the storage portion.

A fifteenth aspect according to the technology of the present disclosure is the imaging element according to any one of the first aspect to the fourteenth aspect, in which the imaging element is a laminated imaging element that includes a photoelectric conversion element and in which the photoelectric conversion element is laminated with the storage portion.

Accordingly, the imaging element of the fifteenth aspect according to the technology of the present disclosure can decide the degree of difference between the first captured image data and the second captured image data more quickly than in a case where an imaging element of a type in which the photoelectric conversion element is not laminated with the storage portion is used.

A sixteenth aspect according to the technology of the present disclosure is an imaging apparatus comprising the imaging element according to any one aspect of the first aspect to the fifteenth aspect according to the technology of the present disclosure, and a control portion that performs a control for displaying, on a display portion, an image based on the compressed image data output by the output portion included in the imaging element.

Accordingly, the imaging apparatus of the sixteenth aspect according to the technology of the present disclosure can reduce power consumption accompanied by outputting the image data to the outside of the imaging element, compared to a case where the image data obtained by imaging is output to the outside of the imaging element.

A seventeenth aspect according to the technology of the present disclosure is an image data processing method of an imaging element in which a storage portion, a processing portion, and an output portion are incorporated, the image data processing method comprising storing captured image data obtained by imaging a subject at a first frame rate by the storage portion, performing processing on the captured image data by the processing portion, outputting at least one of the captured image data or processed image data obtained by performing the processing on the captured image data to an outside of the imaging element by the output portion, generating, by the processing portion, in accordance with a degree of difference between first captured image data obtained by imaging and second captured image data stored in the storage portion, compressed image data obtained by compressing the first captured image data by dividing the first captured image data into a plurality of bit ranges, and outputting the compressed image data generated by the processing portion to the outside as the processed image data at a second frame rate by the output portion.

Accordingly, the image data processing method of the seventeenth aspect according to the technology of the present disclosure can reduce power consumption accompanied by outputting the image data to the outside of the imaging element, compared to a case where the image data obtained by imaging is output to the outside of the imaging element.

An eighteenth aspect according to the technology of the present disclosure is a program causing a computer to function as a processing portion and an output portion included in an imaging element in which a storage portion, the processing portion, and the output portion are incorporated, in which the storage portion stores captured image data obtained by imaging a subject at a first frame rate, the processing portion performs processing on the captured image data, the output portion outputs at least one of the captured image data or processed image data obtained by performing the processing on the captured image data to an outside of the imaging element, the processing portion generates, in accordance with a degree of difference between first captured image data obtained by imaging by a photoelectric conversion element and second captured image data stored in the storage portion, compressed image data obtained by compressing the first captured image data by dividing the first captured image data into a plurality of bit ranges, and the output portion outputs the compressed image data generated by the processing portion to the outside as the processed image data at a second frame rate.

Accordingly, the program of the eighteenth aspect according to the technology of the present disclosure can reduce power consumption accompanied by outputting the image data to the outside of the imaging element, compared to a case where the image data obtained by imaging is output to the outside of the imaging element.

A nineteenth aspect according to the technology of the present disclosure is an imaging element comprising a memory that stores captured image data obtained by imaging a subject at a first frame rate and is incorporated in the imaging element, and a processor that performs processing on the captured image data, outputs at least one of the captured image data or processed image data obtained by performing the processing on the captured image data to an outside of the imaging element, and is incorporated in the imaging element, in which the processor generates, in accordance with a degree of difference between first captured image data obtained by imaging and second captured image data stored in the memory, compressed image data obtained by compressing the first captured image data by dividing the first captured image data into a plurality of bit ranges, and outputs the generated compressed image data to the outside as the processed image data at a second frame rate.

According to one embodiment of the present invention, an effect of being able to reduce power consumption accompanied by outputting image data to an outside of an imaging element, compared to a case where image data obtained by imaging is output to the outside of the imaging element is achieved.

BRIEF DESCRIPTION OF THE DRAWINGS

Exemplary embodiments of the present invention will be described in detail based on the following figures, wherein:

FIG. 8 is a flowchart illustrating one example of a flow of image data output processing according to the first to fourth embodiments;

FIG. 9 is a flowchart illustrating one example of a flow of display control processing according to the first to fourth embodiments;

FIG. 11 is a descriptive diagram for describing one example of a method of deciding high-order n bits;

FIG. 17 is a schematic configuration diagram illustrating one example of a method of assigning a bit range specifying flag to the compressed pixel data;

DETAILED DESCRIPTION

Hereinafter, one example of an embodiment of an imaging apparatus according to the embodiment of the technology of the present disclosure will be described in accordance with the appended drawings.

First Embodiment

Figure 1:
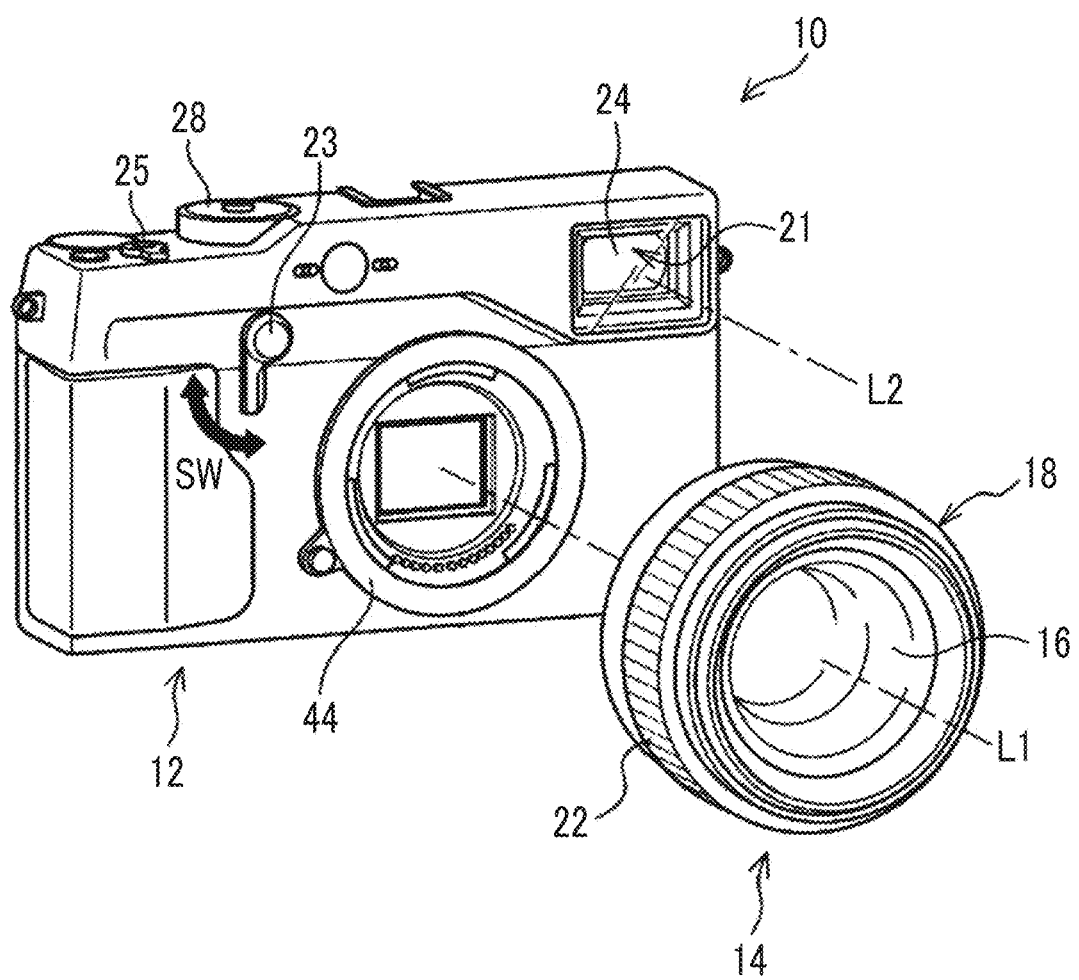
FIG. 1 is a perspective view illustrating one example of an exterior of an imaging apparatus that is an interchangeable lens camera according to first to fourth embodiments.

For example, as illustrated in FIG. 1, an imaging apparatus 10 is an interchangeable lens camera. The imaging apparatus 10 is a digital camera that includes an imaging apparatus main body 12 and an interchangeable lens 14 interchangeably mounted on the imaging apparatus main body 12, and does not include a reflex mirror. The interchangeable lens 14 includes an imaging lens 18 including a focus lens 16 that is movable in an optical axis direction by a manual operation.

A hybrid finder (registered trademark) 21 is disposed in the imaging apparatus main body 12. For example, the hybrid finder 21 here refers to a finder in which an optical view finder (hereinafter, referred to as the OVF) and an electronic view finder (hereinafter, referred to as the EVF) are selectively used. The abbreviation OVF stands for "Optical View Finder". The abbreviation EVF stands for "Electronic View Finder".

The interchangeable lens 14 is interchangeably mounted on the imaging apparatus main body 12. A focus ring 22 that is used at a time of a manual focus mode is disposed in a lens barrel of the interchangeable lens 14. The focus lens 16 moves in the optical axis direction in accordance with a manual rotation operation of the focus ring 22, and an image of subject light is formed on an imaging element 20 (refer to FIG. 3), described later, at a focal position corresponding to a subject distance.

A finder window 24 of the OVF included in the hybrid finder 21 is disposed on a front surface of the imaging apparatus main body 12. In addition, a finder switching lever (finder switching portion) 23 is disposed on the front surface of the imaging apparatus main body 12. In a case where the finder switching lever 23 is rotationally moved in a direction of an arrow SW, switching is performed between an optical image that is visually recognizable by the OVF, and an electronic image (live view image) that is visually recognizable by the EVF.

An optical axis L2 of the OVF is an optical axis different from an optical axis L1 of the interchangeable lens 14. A release button 25 and a dial 28 for setting such as a mode of an imaging system and a mode of a playback system are disposed on an upper surface of the imaging apparatus main body 12.

The release button 25 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10 according to a first embodiment, an imaging mode and a playback mode are selectively set as an operation mode in accordance with an instruction from a user. In the imaging mode, the manual focus mode and an auto focus mode are selectively set in accordance with an instruction from the user. In the auto focus mode, an imaging condition is adjusted by causing the release button 25 to enter the half push state, and then, exposure is performed in a case where the full push state is subsequently set. That is, after an exposure state is set by an automatic exposure (AE) function by causing the release button 25 to enter the half push state, a focusing control is performed by an auto-focus (AF) function, and imaging is performed in a case where the release button 25 is caused to enter the full push state.

Figure 2:
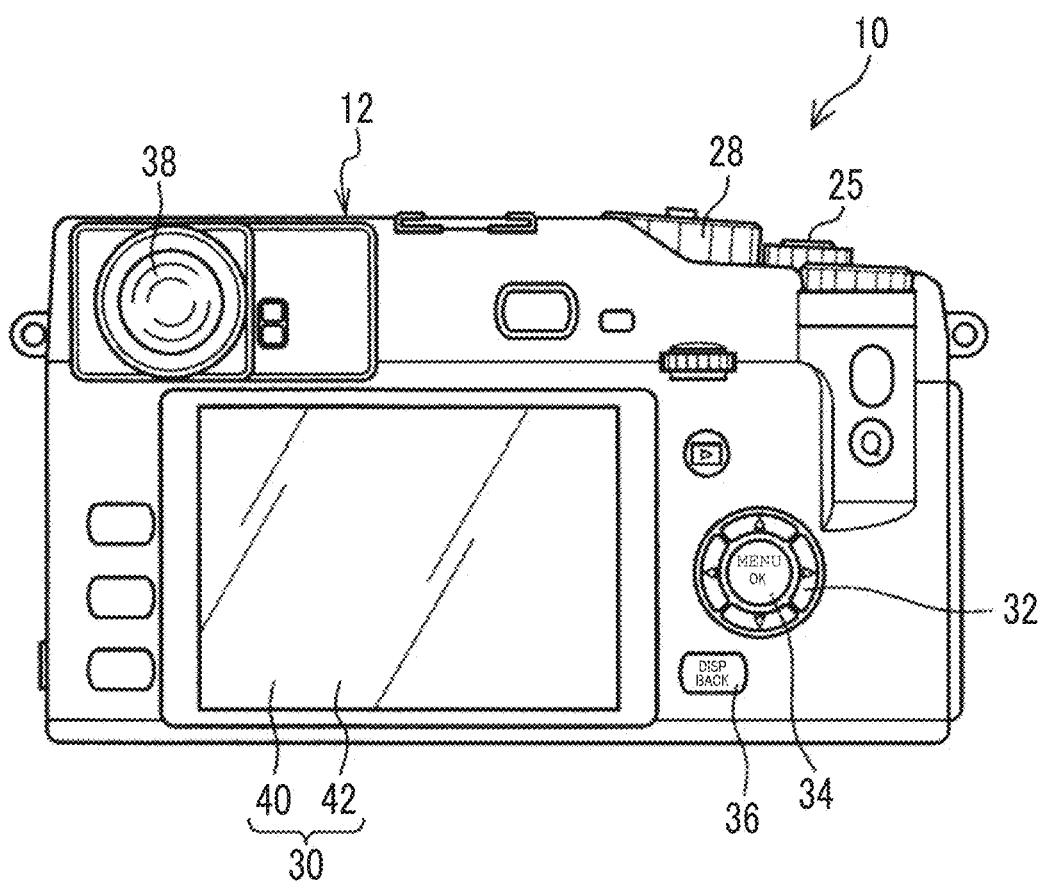
FIG. 2 is a rear view illustrating a rear surface side of the imaging apparatus according to the first to fourth embodiments.

For example, as illustrated in FIG. 2, a touch panel display 30, a cross key 32, a menu key 34, an instruction button 36, and a finder eyepiece portion 38 are disposed on a rear surface of the imaging apparatus main body 12.

The touch panel display 30 comprises a liquid crystal display (hereinafter, referred to as a "first display") 40 and a touch panel 42 (refer to FIG. 3).

The first display 40 displays an image, a text information, and the like. The first display 40 is used for displaying a live view image (live preview image) that is one example of a consecutive frame image obtained by imaging in consecutive frames at a time of the imaging mode. The first display 40 is also used for displaying a still picture that is one example of a single frame image obtained by imaging in a single frame in a case where an instruction to image a still picture is provided. Furthermore, the first display 40 is used for displaying a playback image at a time of the playback mode and/or displaying a menu screen or the like.

The touch panel 42 is a transmissive touch panel and is overlaid on a surface of a display region of the first display 40. The touch panel 42 detects a contact of an instruction object such as a finger or a stylus pen. The touch panel 42 outputs detection result information indicating a detection result (presence or absence of the contact of the instruction object with the touch panel 42) to a predetermined output destination (for example, a CPU 52 (refer to FIG. 3) described later) in a predetermined cycle (for example, 100 milliseconds). In a case where the touch panel 42 detects the contact of the instruction object, the detection result information includes two-dimensional coordinates (hereinafter, referred to as the "coordinates") capable of specifying a contact position of the instruction object on the touch panel 42. In a case where the touch panel 42 does not detect the contact of the instruction object, the detection result information does not include the coordinates.

The cross key 32 has a function as a multifunction key that outputs various instruction signals for selecting one or a plurality of menus, zooming, and/or frame advance or the like. The menu key 34 is an operation key that has both of a function as a menu button for providing an instruction to display one or a plurality of menus on a screen of the first display 40 and a function as an instruction button for providing an instruction for confirmation, execution, and the like of a selected content. The instruction button 36 is operated in a case of deleting a desired target such as a selected item, canceling a designated content, and returning to an immediately previous operation state.

The imaging apparatus 10 has a still picture imaging mode and a motion picture imaging mode as an operation mode of the imaging system. The still picture imaging mode is an operation mode in which a still picture obtained by imaging a subject by the imaging apparatus 10 is recorded, and the motion picture imaging mode is an operation mode in which a motion picture obtained by imaging the subject by the imaging apparatus 10 is recorded.

Figure 3:
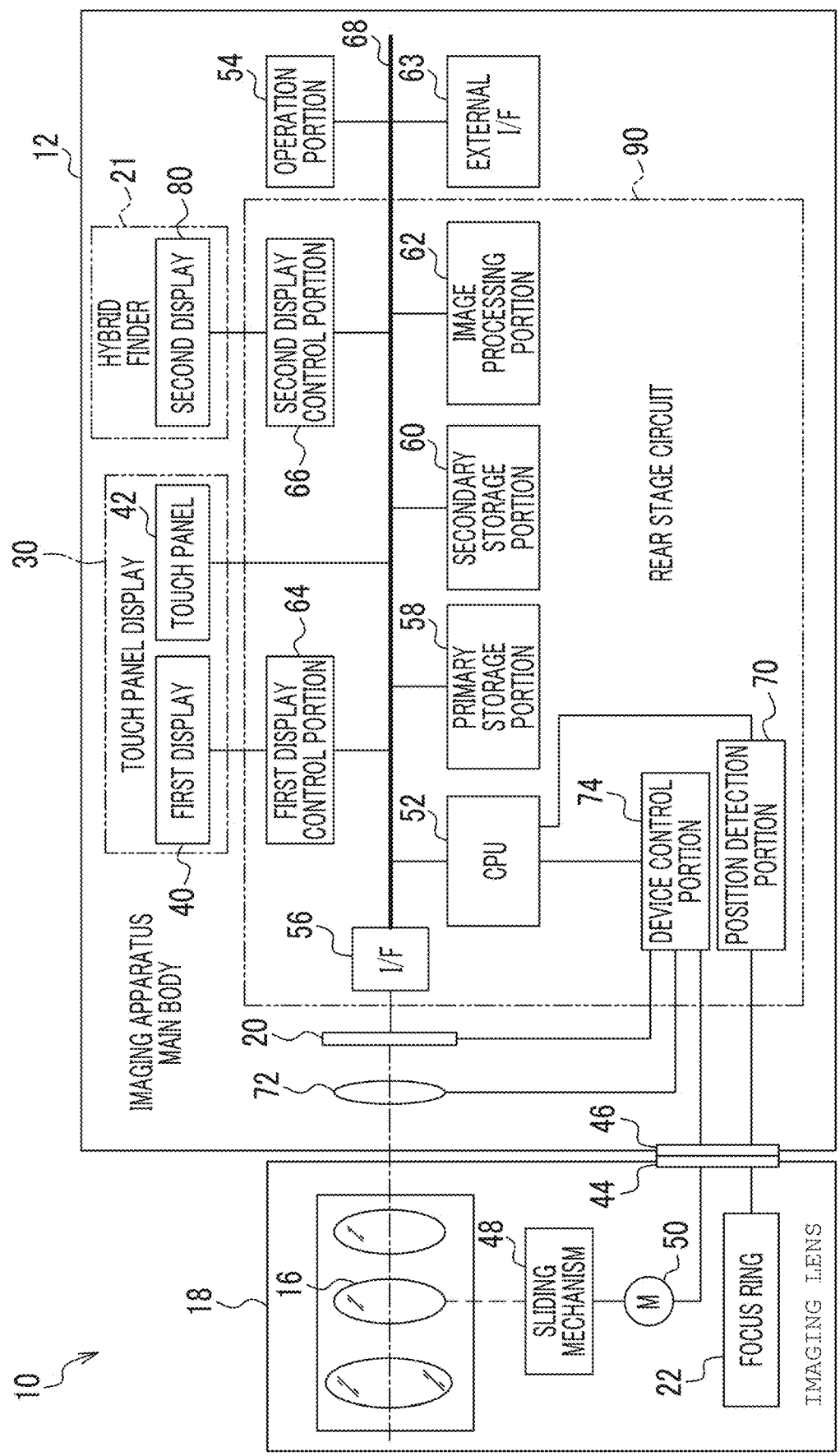
FIG. 3 is a block diagram illustrating one example of a hardware configuration of the imaging apparatus according to the first to fourth embodiments.

For example, as illustrated in FIG. 3, the imaging apparatus 10 includes a mount 46 (refer to FIG. 1) comprised in the imaging apparatus main body 12, and a mount 44 on an interchangeable lens 14 side corresponding to the mount 46. The interchangeable lens 14 is interchangeably mounted on the imaging apparatus main body 12 by joining the mount 44 to the mount 46.

The imaging lens 18 includes a sliding mechanism 48 and a motor 50. The sliding mechanism 48 moves the focus lens 16 along the optical axis L1 by operating the focus ring 22. The focus lens 16 is slidably attached to the sliding mechanism 48 along the optical axis L1. The motor 50 is connected to the sliding mechanism 48, and the sliding mechanism 48 slides the focus lens 16 along the optical axis L1 by receiving motive power of the motor 50.

The motor 50 is connected to the imaging apparatus main body 12 through the mounts 44 and 46, and driving thereof is controlled in accordance with a command from the imaging apparatus main body 12. In the first embodiment, a stepping motor is applied as one example of the motor 50. Accordingly, the motor 50 operates in synchronization with pulse power in accordance with a command from the imaging apparatus main body 12. While an example in which the motor 50 is disposed in the imaging lens 18 is illustrated in the example illustrated in FIG. 3, the technology of the present disclosure is not limited thereto, and the motor 50 may be disposed in the imaging apparatus main body 12.

The imaging apparatus 10 is a digital camera that records the still picture and the motion picture obtained by imaging the subject. The imaging apparatus main body 12 comprises an operation portion 54, an external interface (I/F) 63, and a rear stage circuit 90. The rear stage circuit 90 is a circuit on a side of receiving data transmitted from the imaging element 20. In the first embodiment, an integrated circuit (IC) is employed as the rear stage circuit 90. Large-scale integration (LSI) is illustrated as one example of the IC.

The imaging apparatus 10 operates in an operation mode of any of a low-speed mode and a high-speed mode. The low-speed mode refers to an operation mode in which the rear stage circuit 90 performs processing at a low frame rate. In the first embodiment, 60 frames per second (fps) is employed as the low frame rate.

Meanwhile, the high-speed mode refers to an operation mode in which the rear stage circuit 90 performs processing at a high frame rate. In the first embodiment, 240 fps is employed as the high frame rate.

While 60 fps is illustrated as the low frame rate and 240 fps is illustrated as the high frame rate in the first embodiment, the technology of the present disclosure is not limited thereto. The low frame rate may be 30 fps, and the high frame rate may be 120 fps. The point is that the high frame rate is higher than the low frame rate.

The rear stage circuit 90 includes the central processing unit (CPU) 52, an I/F 56, a primary storage portion 58, a secondary storage portion 60, an image processing portion 62, a first display control portion 64, a second display control portion 66, a position detection portion 70, and a device control portion 74. A single CPU is illustrated as the CPU 52 in the first embodiment. However, the technology of the present disclosure is not limited thereto, and a plurality of CPUs may be employed instead of the CPU 52. That is, various types of processing executed by the CPU 52 may be executed by one processor or a plurality of physically separated processors.

In the first embodiment, each of the image processing portion 62, the first display control portion 64, the second display control portion 66, the position detection portion 70, and the device control portion 74 is implemented by an application specific integrated circuit (ASIC). However, the technology of the present disclosure is not limited thereto. For example, instead of the ASIC, at least one of a programmable logic device (PLD) or a field-programmable gate array (FPGA) may be employed. Alternatively, at least one of the ASIC, the PLD, or the FPGA may be employed. Alternatively, a computer including a CPU, a read only memory (ROM), and a random access memory (RAM) may be employed. The CPU may be a single CPU or a plurality of CPUs. In addition, at least one of the image processing portion 62, the first display control portion 64, the second display control portion 66, the position detection portion 70, or the device control portion 74 may be implemented by a combination of a hardware configuration and a software configuration.

The CPU 52, the I/F 56, the primary storage portion 58, the secondary storage portion 60, the image processing portion 62, the first display control portion 64, the second display control portion 66, the operation portion 54, the external I/F 63, and the touch panel 42 are connected to each other through a bus 68.

The CPU 52 controls the entire imaging apparatus 10. In the imaging apparatus 10 according to the first embodiment, at a time of the auto focus mode, the CPU 52 performs the focusing control by controlling driving of the motor 50 such that a contrast value of the image obtained by imaging is maximized. In addition, at the time of the auto focus mode, the CPU 52 calculates AE information that is a physical quantity indicating brightness of the image obtained by imaging. In a case where the release button 25 is caused to enter the half push state, the CPU 52 derives a shutter speed and an F number corresponding to the brightness of the image indicated by the AE information. The exposure state is set by controlling each related portion to achieve the derived shutter speed and the F number.

The primary storage portion 58 means a volatile memory and refers to, for example, a RAM. The secondary storage portion 60 means a non-volatile memory and refers to, for example, a flash memory or a hard disk drive (HDD).

The operation portion 54 is a user interface that is operated by the user in a case of providing various instructions to the rear stage circuit 90. The operation portion 54 includes the release button 25, the dial 28, the finder switching lever 23, the cross key 32, the menu key 34, and the instruction button 36. Various instructions received by the operation portion 54 are output to the CPU 52 as an operation signal, and the CPU 52 executes processing corresponding to the operation signal input from the operation portion 54.

The position detection portion 70 is connected to the CPU 52. The position detection portion 70 is connected to the focus ring 22 through the mounts 44 and 46, detects a rotation angle of the focus ring 22, and outputs rotation angle information indicating a rotation angle that is a detection result to the CPU 52. The CPU 52 executes processing corresponding to the rotation angle information input from the position detection portion 70.

In a case where the imaging mode is set, image light showing the subject is formed on a light receiving surface of the color imaging element 20 through the imaging lens 18 including the focus lens 16 which is movable by a manual operation, and a mechanical shutter 72.

The device control portion 74 is connected to the CPU 52. In addition, the device control portion 74 is connected to the imaging element 20 and the mechanical shutter 72. Furthermore, the device control portion 74 is connected to the motor 50 of the imaging lens 18 through the mounts 44 and 46.

The device control portion 74 controls the imaging element 20, the mechanical shutter 72, and the motor 50 under control of the CPU 52.

Figure 4:
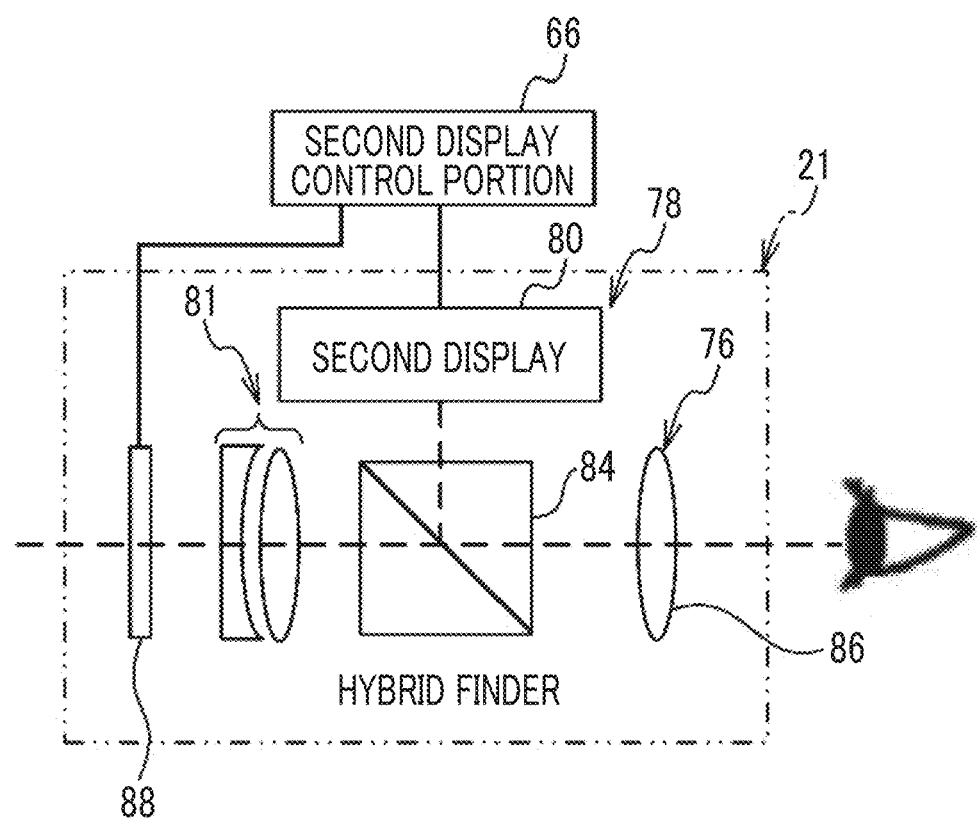
FIG. 4 is a schematic configuration diagram illustrating one example of a configuration of a hybrid finder included in the imaging apparatus according to the first to fourth embodiments.

For example, as illustrated in FIG. 4, the hybrid finder 21 includes an OVF 76 and an EVF 78. The OVF 76 is a reverse Galilean finder including an objective lens 81 and an eyepiece lens 86, and the EVF 78 includes a second display 80, a prism 84, and the eyepiece lens 86.

A liquid crystal shutter 88 is arranged in front of the objective lens 81. The liquid crystal shutter 88 blocks light such that the optical image is not incident on the objective lens 81 in a case of using the EVF 78.

The prism 84 guides the electronic image or various information to be displayed on the second display 80 to the eyepiece lens 86 by reflecting the electronic image or various information, and combines the optical image with the electronic image and/or various information to be displayed on the second display 80.

In a case where the finder switching lever 23 is rotationally moved in the direction of the arrow SW illustrated in FIG. 1, an OVF mode in which the optical image is visually recognizable by the OVF 76 and an EVF mode in which the electronic image is visually recognizable by the EVF 78 are alternately switched each time the finder switching lever 23 is rotationally moved.

In a case of the OVF mode, the second display control portion 66 enables the optical image to be visually recognized from the eyepiece portion by controlling the liquid crystal shutter 88 to enter a non-light blocking state. In a case of the EVF mode, the second display control portion 66 enables only the electronic image displayed on the second display 80 to be visually recognized from the eyepiece portion by controlling the liquid crystal shutter 88 to enter a light blocking state.

Figure 5:
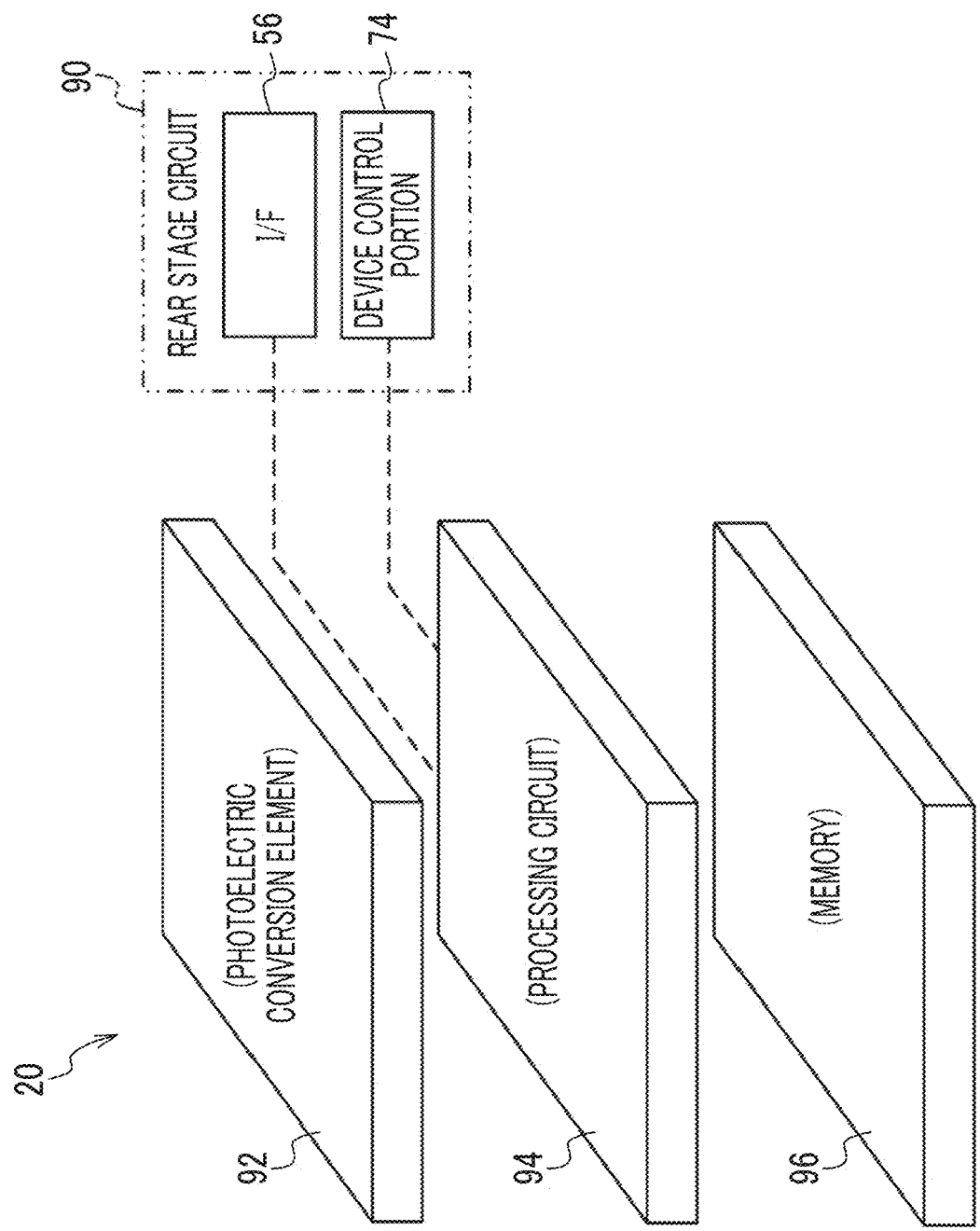
FIG. 5 is a schematic configuration diagram illustrating one example of a schematic configuration of an imaging element included in the imaging apparatus according to the first to fourth embodiments.

The imaging element 20 is one example of a "laminated imaging element" according to the embodiment of the technology of the present disclosure. For example, the imaging element 20 is a complementary metal oxide semiconductor (CMOS) image sensor. For example, as illustrated in FIG. 5, a photoelectric conversion element 92, a processing circuit 94, and a memory 96 are incorporated in the imaging element 20. In the imaging element 20, the photoelectric conversion element 92 is laminated with the processing circuit 94 and the memory 96. The memory 96 is one example of a storage portion according to the embodiment of the technology of the present disclosure.

The processing circuit 94 is, for example, LSI, and the memory 96 is, for example, a RAM. A DRAM is employed as one example of the memory 96 in the first embodiment. However, the technology of the present disclosure is not limited thereto, and a static random access memory (SRAM) may be used.

The processing circuit 94 is implemented by an ASIC in the first embodiment. However, the technology of the present disclosure is not limited thereto. For example, at least one of a PLD or an FPGA may be employed instead of the ASIC. Alternatively, at least one of the ASIC, the PLD, or the FPGA may be employed. Alternatively, a computer including a CPU, a ROM, and a RAM may be employed. The CPU may be a single CPU or a plurality of CPUs. Alternatively, the processing circuit 94 may be implemented by a combination of a hardware configuration and a software configuration.

The photoelectric conversion element 92 includes a plurality of photosensors arranged in a matrix form. In the first embodiment, photodiodes are employed as one example of the photosensors. Photodiodes of "4896×3265" pixels are illustrated as one example of the plurality of photosensors.

The photoelectric conversion element 92 comprises color filters, and the color filters include a G filter corresponding to green (G) that most contributes to obtaining a brightness signal, an R filter corresponding to red (R), and a B filter corresponding to blue (B). In the first embodiment, the G filter, the R filter, and the B filter are arranged with a predetermined periodicity in each of a row direction (horizontal direction) and a column direction (vertical direction) for the plurality of photodiodes of the photoelectric conversion element 92. Thus, the imaging apparatus 10 can perform processing in accordance with a repeating pattern in a case of performing demosaicing and the like on R, G, and B signals. The demosaicing refers to processing of calculating all color information for each pixel from a mosaic image corresponding to color filter arrangement of a single plate color imaging element. For example, in a case of an imaging element consisting of color filters of three colors of R, G, and B, the demosaicing means processing of calculating color information about all of R, G, and B for each pixel from a mosaic image consisting of R, G, and B.

While the CMOS image sensor is illustrated as the imaging element 20, the technology of the present disclosure is not limited thereto. For example, the technology of the present disclosure is also established in a case where the photoelectric conversion elements 92 is a charge coupled device (CCD) image sensor.

The imaging element 20 has a so-called electronic shutter function and controls an electric charge accumulation time period of each photodiode in the photoelectric conversion element 92 by performing the electronic shutter function under control of the device control portion 74. The electric charge accumulation time period refers to a so-called shutter speed.

The processing circuit 94 is controlled by the device control portion 74. The processing circuit 94 reads out captured image data that is obtained by imaging the subject by the photoelectric conversion element 92. The "captured image data" here refers to image data indicating the subject. The captured image data is signal electric charges accumulated in the photoelectric conversion element 92. As described in detail later, the captured image data is broadly classified into first captured image data and second captured image data.

In the first embodiment, image data that is obtained by imaging the subject by a plurality of photodiodes included in one designated partial region among all photodiodes included in the photoelectric conversion element 92 is employed as one example of the captured image data. However, the technology of the present disclosure is not limited thereto. For example, image data that is obtained by imaging the subject by all photodiodes in the photoelectric conversion element 92 may be employed.

The processing circuit 94 performs analog/digital (A/D) conversion on the captured image data read out from the photoelectric conversion element 92. The processing circuit 94 stores, in the memory 96, the captured image data obtained by performing the A/D conversion on the captured image data. The processing circuit 94 acquires the captured image data from the memory 96. The processing circuit 94 outputs, to the I/F 56 of the rear stage circuit 90, processed image data that is obtained by performing processing on the acquired captured image data.

Hereinafter, for convenience of description, an example of a form in which the processing circuit 94 outputs the processed image data to the I/F 56 of the rear stage circuit 90 will be illustratively described. However, the technology of the present disclosure is not limited thereto. For example, the processing circuit 94 may output the acquired captured image data to the I/F 56 of the rear stage circuit 90 or may output both of the captured image data and the processed image data to the I/F 56 of the rear stage circuit 90. Alternatively, the processing circuit 94 may selectively output the captured image data and the processed image data to the I/F 56 of the rear stage circuit 90 in accordance with an instruction provided from the user or an imaging environment.

Figure 6:
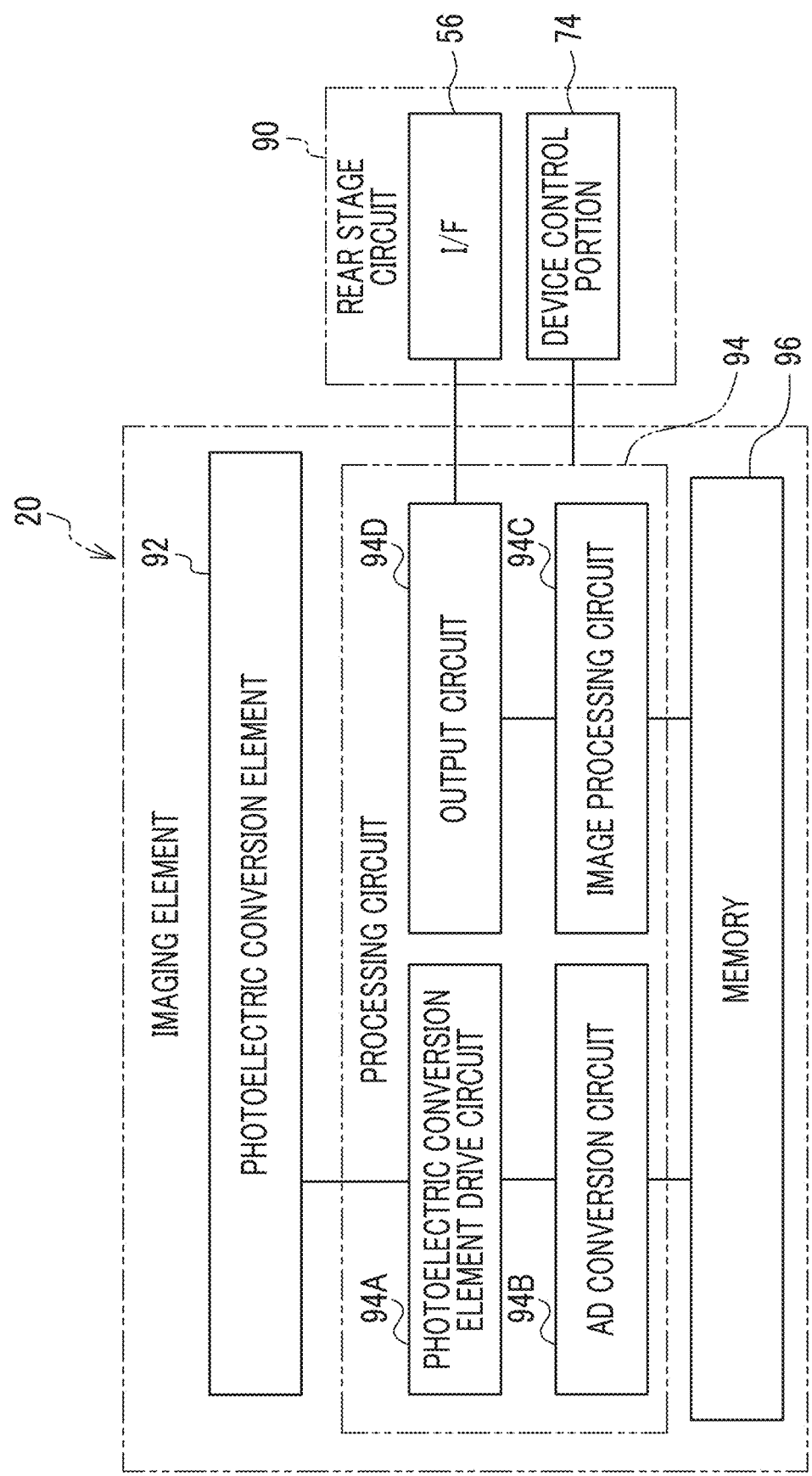
FIG. 6 is a block diagram illustrating one example of a main configuration of the imaging element included in the imaging apparatus according to the first to fourth embodiments.

For example, as illustrated in FIG. 6, the processing circuit 94 includes a photoelectric conversion element drive circuit 94A, an analog-to-digital (AD) conversion circuit 94B, an image processing circuit 94C, and an output circuit 94D and operates under control of the CPU 52. The photoelectric conversion element drive circuit 94A is connected to the photoelectric conversion element 92 and the AD conversion circuit 94B. The memory 96 is connected to the AD conversion circuit 94B and the image processing circuit 94C. The image processing circuit 94C is connected to the output circuit 94D. The output circuit 94D is connected to the I/F 56 of the rear stage circuit 90.

The image processing circuit 94C is one example of a "processing portion" according to the embodiment of the technology of the present disclosure. The output circuit 94D is one example of an "output portion" according to the embodiment of the technology of the present disclosure.

The photoelectric conversion element drive circuit 94A controls the photoelectric conversion element 92 and reads out analog captured image data from the photoelectric conversion element 92 under control of the device control portion 74. The AD conversion circuit 94B digitizes the captured image data read out by the photoelectric conversion element drive circuit 94A and stores the digitized captured image data in the memory 96.

In the imaging apparatus 10, various types of processing can be executed at a plurality of frame rates including a first frame rate and a second frame rate. Both of the first frame rate and the second frame rate are variable frame rates. The first frame rate is a frame rate higher than the second frame rate.

The image processing circuit 94C performs processing on the captured image data stored in the memory 96. The output circuit 94D outputs the processed image data obtained by performing processing by the image processing circuit 94C to an outside of the imaging element 20 at the second frame rate. The "outside of the imaging element 20" here refers to the I/F 56 of the rear stage circuit 90.

In the imaging element 20, the subject is imaged at the first frame rate. In the imaging element 20, reading out by the photoelectric conversion element drive circuit 94A, storage of the captured image data in the memory 96 by the AD conversion circuit 94B, and processing by the image processing circuit 94C are performed at the first frame rate. However, the technology of the present disclosure is not limited thereto. For example, among reading out by the photoelectric conversion element drive circuit 94A, storage of the captured image data in the memory 96 by the AD conversion circuit 94B, and processing by the image processing circuit 94C, at least storage of the captured image data in the memory 96 by the AD conversion circuit 94B may be performed at the first frame rate. In this case, an example of a form in which reading out by the photoelectric conversion element drive circuit 94A and storage of the captured image data in the memory 96 by the AD conversion circuit 94B are performed at the first frame rate among reading out by the photoelectric conversion element drive circuit 94A, storage of the captured image data in the memory 96 by the AD conversion circuit 94B, and processing by the image processing circuit 94C is illustrated.

The image processing circuit 94C generates, in accordance with a degree of difference between the first captured image data and the second captured image data, compressed image data that is obtained by compressing the first captured image data by dividing the first captured image data into a plurality of bit ranges.

The first captured image data refers to the captured image data obtained by imaging the subject by the photoelectric conversion element 92, and the second captured image data refers to the captured image data stored in the memory 96. In other words, out of a pair of pieces of captured image data that are adjacent in time of imaging of the subject, the captured image data that is captured earlier and obtained is the second captured image data, and the captured image data that is captured later and obtained is the first captured image data. In the first embodiment, the first captured image data is the most recent captured image data obtained by imaging the subject by the photoelectric conversion element 92, and the second captured image data is the captured image data obtained earlier than the first captured image data by one frame.

For example, the "plurality of bit ranges" here refer to a high-order bit range and a low-order bit range. In a case where the captured image data of one frame is 12 bits, the high-order bit range refers to high-order 6 bits of 12 bits, and the low-order bit range refers to low-order 6 bits of 12 bits. Here, the "captured image data of one frame is 12 bits" means that each pixel has a pixel value of 12 bits. Thus, the high-order bit range means high-order 6 bits of 12 bits for the pixel value of each pixel, and the low-order bit range means low-order 6 bits of 12 bits for the pixel value of each pixel. Hereinafter, the pixel value will be referred to as "pixel data".

Next, actions of parts of the imaging apparatus 10 according to the embodiment of the technology of the present disclosure will be described.

Hereinafter, for convenience of description, the first display 40 and the second display 80 will be referred to as a "display apparatus" without a reference sign unless otherwise necessary to distinguish therebetween for description. The display apparatus is one example of a "display portion" according to the embodiment of the technology of the present disclosure. In addition, hereinafter, for convenience of description, the first display control portion 64 and the second display control portion 66 will be referred to as a "display control portion" without a reference sign unless otherwise necessary to distinguish therebetween for description. The display control portion is one example of a "control portion" according to the embodiment of the technology of the present disclosure.

In addition, hereinafter, for convenience of description, a case of displaying the live view image on the display apparatus will be described. Hereinafter, for convenience of description, the memory 96 will be assumed to be a memory capable of storing the captured image data of two or more frames using a FIFO method. In addition, hereinafter, for convenience of description, the captured image data of two or more frames will be assumed to be already stored in the memory 96. In addition, in the following description, out of the captured image data of two frames adjacent in time of storage in the memory 96, the captured image data stored in the memory 96 earlier is the second captured image data, and the captured image data stored in the memory 96 subsequently to the second captured image data is the first captured image data. Hereinafter, an image indicated by the first captured image data will be referred to as a "first captured image", and an image indicated by the second captured image data will be referred to as a "second captured image".

First, compression processing executed by the image processing circuit 94C in a case where the image processing circuit 94C of the processing circuit 94 generates the compressed image data of one frame will be described with reference to FIG. 7.

Figure 7:
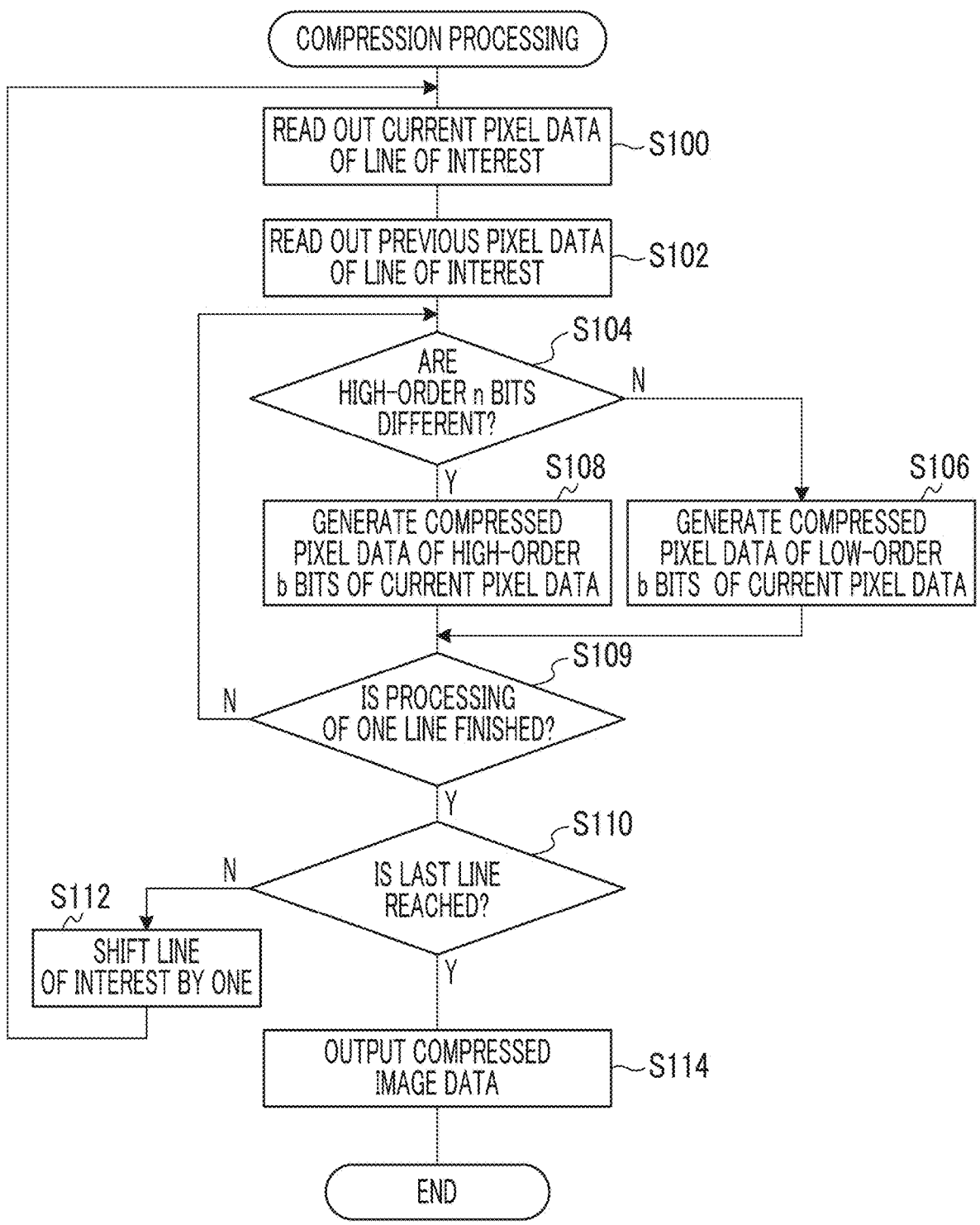
FIG. 7 is a flowchart illustrating one example of a flow of compression processing according to the first embodiment.

The compression processing illustrated in FIG. 7 is performed at the first frame rate by the processing circuit 94.

For convenience of description, in the compression processing illustrated in FIG. 7, the number of bits of the captured image data of one frame stored in the memory 96 is 12, and a purpose of the compression processing is to compress the first captured image data into image data of 7 bits. The original number of bits of both of the first captured image data and the second captured image data is 12. The "original number of bits" here refers to the number of bits of the first captured image data and the second captured image data stored in the memory 96 before the compression processing illustrated in FIG. 7 is executed. In the compression processing illustrated in FIG. 7, 12 bits are one example of a "first bit" according to the embodiment of the technology of the present disclosure, and 7 bits are one example of a "second bit" according to the embodiment of the technology of the present disclosure.

In the compression processing illustrated in FIG. 7, first, in step S100, the image processing circuit 94C reads out current pixel data Dn of each of all pixels of the first captured image from the memory 96 for a line of interest, and then, the compression processing transitions to step S102. The line of interest refers to one non-used horizontal line of first to N-th horizontal lines of the captured image data stored in the memory 96. Here, "non-used" means not being used yet in processing of step S106 or step S108 described later. The current pixel data Dn refers to the pixel data of pixels included in the first captured image data. The number of bits of the current pixel data Dn read out from the memory 96 is 12.

In step S102, the image processing circuit 94C reads out previous pixel data Dp of each of all pixels of the second captured image from the memory 96 for the line of interest, and then, the compression processing transitions to step S104. The previous pixel data Dp refers to the pixel data of pixels included in the second captured image data. The number of bits of the previous pixel data Dp read out from the memory 96 is 12.

In step S104, the image processing circuit 94C compares high-order n bits between the current pixel data Dn read out in step S100 and the previous pixel data Dp read out in step S102 for a pixel of interest. The image processing circuit 94C determines whether or not high-order n bits are different between the current pixel data Dn and the previous pixel data Dp. The "pixel of interest" refers to a non-processed pixel among all pixels of the line of interest. The "non-processed pixel" refers to a pixel that is not yet used as a processing target of step S106 or step S108.

The "high-order n bits" here are one example of a predetermined high-order bit according to the embodiment of the technology of the present disclosure. In step S104, the high-order n bits are high-order 5 bits. High-order 5 bits are bits corresponding to a value obtained by subtracting 7 which is the number of bits of the compressed image data obtained by compressing the first captured image data, from 12 which is the number of bits of the first captured image data.

In step S104, in a case where the high-order n bits of the current pixel data Dn and the previous pixel data Dp are the same, a negative determination is made, and the compression processing transitions to step S106. In step S104, in a case where the high-order n bits of the current pixel data Dn and the previous pixel data Dp are different, a positive determination is made, and the compression processing transitions to step S108.

A case where the high-order n bits of the current pixel data Dn and the previous pixel data Dp are the same means a case where the subject is not changed. Meanwhile, a case where the high-order n bits of the current pixel data Dn and the previous pixel data Dp are different means a case where the subject is changed.

In step S106, the image processing circuit 94C generates compressed pixel data Do of low-order b bits of the current pixel data Dn for the pixel of interest, and then, the compression processing transitions to step S109. In step S106, the low-order b bits are low-order 7 bits. The compressed pixel data Do of the low-order b bits is generated in order to transmit noise information to the rear stage circuit 90.

In step S106, a specific type of image processing may be further performed on the generated compressed pixel data Do of the low-order b bits.

In step S108, the image processing circuit 94C generates the compressed pixel data Do of high-order b bits of the current pixel data Dn for the pixel of interest, and then, the compression processing transitions to step S109. In step S108, the high-order b bits are high-order 7 bits.

In step S108, a specific type of image processing may be further performed on the generated compressed pixel data Do of the high-order b bits.

Figure 10:
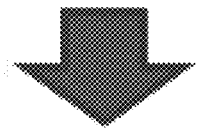
FIG. 10 is a descriptive diagram for describing one example of a method of generating compressed pixel data.

In a case where processing of step S106 or step S108 is executed, for example, the current pixel data Dn is compressed into the compressed pixel data Do as illustrated in FIG. 10.

In the example illustrated in FIG. 10, first, an exclusive logical sum of the current pixel data Dn of 12 bits and the previous pixel data Dp of 12 bits is calculated.

Next, a logical product of data of 12 bits in which high-order 5 bits are "1" and low-order 7 bits are "0", and the exclusive logical sum is calculated. Here, "high-order 5 bits" are illustrated because high-order 5 bits are used as the high-order n bits in step S104. For example, in a case where high-order 7 bits are used as the high-order n bits in step S104, a logical product of data of 12 bits in which high-order 7 bits are "1" and low-order 5 bits are "0", and the exclusive logical sum is calculated.

In a case where the calculated logical product is not "0", high-order [11:5] bits of the current pixel data Dn are used as [6:0] bits of the compressed pixel data Do. In a case where the calculated logical product is "0", low-order [6:0] bits of the current pixel data Dn are used as [6:0] bits of the compressed pixel data Do.

In step S109, a determination as to whether or not processing of one line is finished in step S104 to step S108 is performed. In step S109, in a case where processing of one line is not finished in step S104 to step S108, a negative determination is made, and the compression processing transitions to step S104. In step S109, in a case where processing of one line is finished in step S104 to step S108, a positive determination is made, and the compression processing transitions to step S110.

In step S110, a determination as to whether or not the line of interest reaches the last line in a vertical direction of the first captured image data stored in memory 96 is performed. In step S110, in a case where the line of interest does not reach the last line in the vertical direction of the first captured image data stored in the memory 96, a negative determination is made, and the compression processing transitions to step S112. In step S110, in a case where the line of interest reaches the last line in the vertical direction of the first captured image data stored in the memory 96, a positive determination is made, and the compression processing transitions to step S114.

In step S112, the image processing circuit 94C shifts the line of interest by one line in the vertical direction of the first captured image data stored in the memory 96 by incrementing an address of the line of interest by one, and then, the compression processing transitions to step S100.

In step S114, the image processing circuit 94C outputs the compressed image data of one frame to the output circuit 94D by using the compressed pixel data Do of all pixels obtained by executing processing of step S106 or step S108 as the compressed image data of one frame, and the image processing circuit 94C finishes the compression processing.

The compressed image data output by executing processing of step S114 is one example of "processed image data", "data based on one piece of bit image data", and "data based on divided image data" according to the embodiment of the technology of the present disclosure.

In step S114, the image processing circuit 94C may perform a specific type of image processing on the compressed image data. In this case, processed compressed image data obtained by performing the specific type of image processing on the compressed image data is output to the output circuit 94D. The "processed compressed image data" here is one example of the "processed image data", the "data based on one piece of bit image data", and the "data based on the divided image data" according to the embodiment of the technology of the present disclosure.

Next, image data output processing executed by the output circuit 94D of the processing circuit 94 will be described with reference to FIG. 8.

In the image data output processing illustrated in FIG. 8, first, in step S130, the output circuit 94D determines whether or not the compressed image data is input from the image processing circuit 94C. In step S130, the compressed image data input from the image processing circuit 94C is the compressed image data output in step S114 included in the compression processing illustrated in FIG. 7.

In step S130, in a case where the compressed image data is input from the image processing circuit 94C, a positive determination is made, and the image data output processing transitions to step S132. In step S130, in a case where the compressed image data is not input from the image processing circuit 94C, a negative determination is made, and the image data output processing transitions to step S134.

In step S132, the output circuit 94D outputs the compressed image data input in step S130 to the I/F 56 of the rear stage circuit 90 at the second frame rate, and then, the image data output processing transitions to step S134.

In step S134, the output circuit 94D determines whether or not an image data output processing finish condition that is a condition for finishing the image data output processing is satisfied. For example, a condition that an instruction to finish the image data output processing is received by the touch panel 42 and/or the operation portion 54 is illustrated as the image data output processing finish condition. In addition, for example, a condition that a predetermined time period exceeds from a start of the image data output processing without pushing the release button 25 is illustrated as the image data output processing finish condition. For example, the "predetermined time period" here is five minutes. The predetermined time period may be a fixed value or a variable value that can be changed in accordance with an instruction provided from the user.

In step S134, in a case where the image data output processing finish condition is not satisfied, a negative determination is made, and the image data output processing transitions to step S130. In step S134, in a case where the image data output processing finish condition is satisfied, a positive determination is made, and the output circuit 94D finishes the image data output processing.

Figure 18:
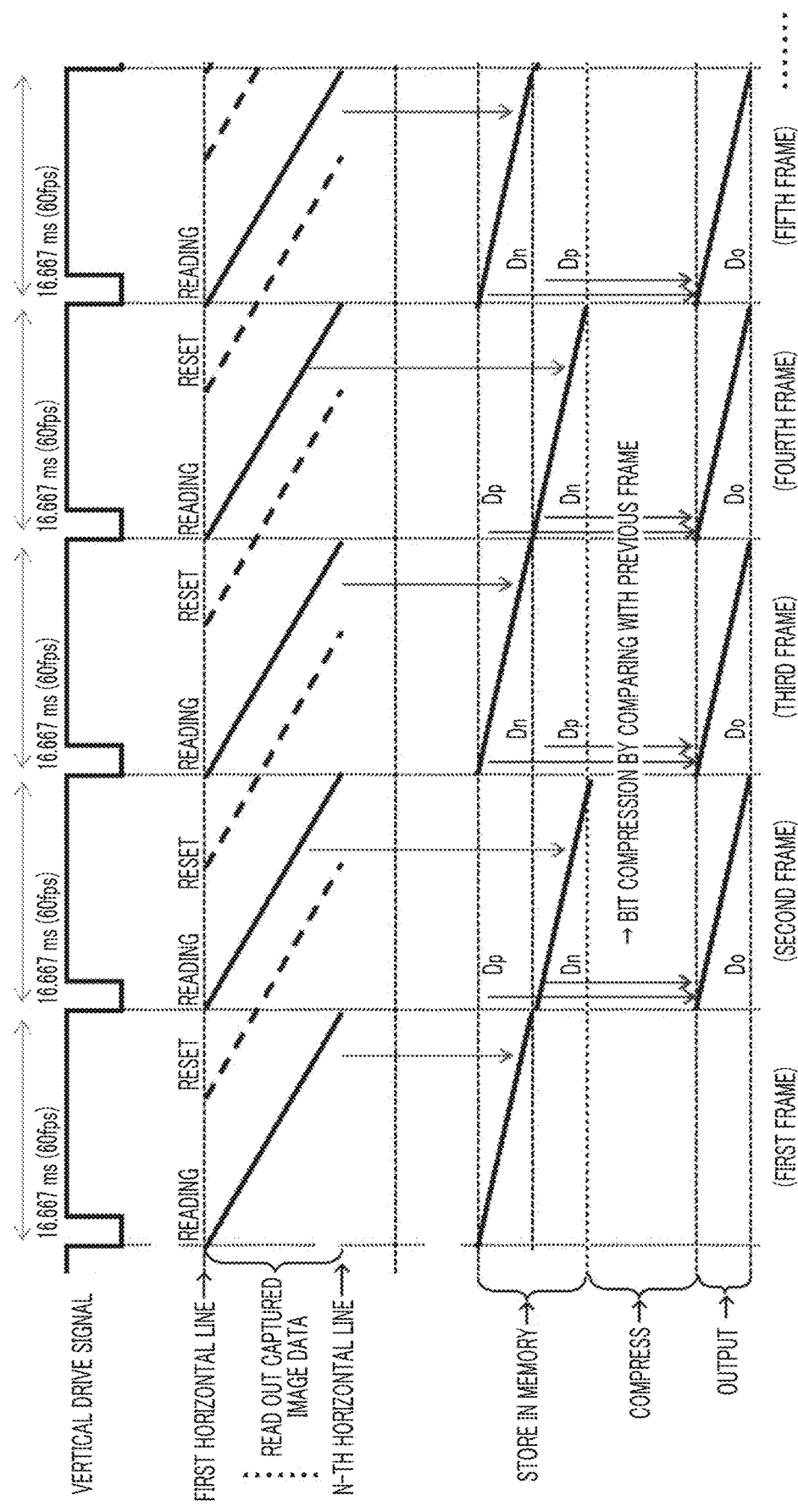
FIG. 18 is a state transition diagram illustrating a first example of a flow of image data in a case where the compression processing and the image data output processing are executed.

By executing the compression processing illustrated in FIG. 7 and the image data output processing illustrated in FIG. 8 by the processing circuit 94, for example, image data transitions as illustrated in FIG. 18.

In the example illustrated in FIG. 18, reading of the captured image data of one frame is started in synchronization with a vertical drive signal, and pixel data is read out from the photoelectric conversion element 92 from the first horizontal line to the N (>1)-th horizontal line. The pixel data of one frame read out from the photoelectric conversion element 92 is first stored in the memory 96 as the current pixel data Dn.

Next, in a case where the pixel data of one frame is read out from the photoelectric conversion element 92 and storage of the pixel data of one frame in the memory 96 is started, the current pixel data Dn of the immediately previous frame already stored in the memory 96 becomes the previous pixel data Dp, and new pixel data is stored in the memory 96 as the current pixel data Dn. For example, in a case where storage of the pixel data of an n-th frame in the memory 96 is started, the pixel data of an (n−1)-th frame is changed to the previous pixel data Dp from the current pixel data Dn, and the pixel data of the n-th frame stored in the memory 96 becomes the current pixel data Dn. The first captured image is subjected to bit compression by comparing the second captured image of the previous frame with the first captured image of the current frame. For example, the bit compression refers to processing of steps S106 and S108 illustrated in FIG. 7, that is, processing of generating the compressed pixel data Do from the first captured image.

Next, the display control processing executed by the display control portion of the rear stage circuit 90 will be described with reference to FIG. 9. For convenience of description, it is assumed that the compressed image data is output to the rear stage circuit 90 from the output circuit 94D by executing the image data output processing illustrated in FIG. 8, and that the compressed image data is input into the CPU 52 and the image processing portion 62.

In the display control processing illustrated in FIG. 9, in step S150, the display control portion determines whether or not the compressed image data is input from the image processing portion 62. In step S150, in a case where the compressed image data is not input from the image processing portion 62, a negative determination is made, and the display control processing transitions to step S154. In step S150, in a case where the compressed image data is input from the image processing portion 62, a positive determination is made, and the display control processing transitions to step S152.

In step S152, the display control portion outputs the compressed image data to the display apparatus as graphics data, and then, the display control processing transitions to step S154. In a case where the compressed image data is output to the display apparatus by executing processing of step S152, the display apparatus displays the image indicated by the compressed image data.

In step S154, the display control portion determines whether or not a display control processing finish condition that is a condition for finishing the display control processing is satisfied. For example, the display control processing finish condition is the same condition as the image data output processing finish condition.

In step S154, in a case where the display control processing finish condition is not satisfied, a negative determination is made, and the display control processing transitions to step S150. In step S154, in a case where the display control processing finish condition is satisfied, a positive determination is made, and the display control portion finishes the display control processing.

As described above, in the imaging apparatus 10 according to the first embodiment, the degree of difference between the first captured image data obtained by imaging the subject by the photoelectric conversion element 92 and the second captured image data stored in the memory 96 is decided by the image processing circuit 94C. For example, the "degree of difference" here is a determination result of step S104. In addition, the compressed image data obtained by compressing the first captured image data by dividing the first captured image data into a plurality of bit ranges is generated by the image processing circuit 94C in accordance with the degree of difference. The compressed image data generated by the image processing circuit 94C is output to the rear stage circuit 90 at the second frame rate by the output circuit 94D.

Accordingly, the imaging apparatus 10 according to the first embodiment can reduce power consumption accompanied by outputting the image data to the outside of the imaging element 20, compared to a case where the first captured image data obtained by imaging is output to the outside of the imaging element 20.

In the imaging apparatus 10 according to the first embodiment, a frame rate higher than the second frame rate is employed as the first frame rate.

Accordingly, the imaging apparatus 10 according to the first embodiment can generate the compressed image data more quickly than in a case where processing is performed by the image processing circuit 94C at the same frame rate as a frame rate used for outputting the compressed image data by the output circuit 94D.

In the imaging apparatus 10 according to the first embodiment, the second captured image data is image data obtained earlier than the first captured image data by one frame.

Accordingly, the imaging apparatus 10 according to the first embodiment can increase the degree of difference between the first captured image data and the second captured image data, compared to a case where the first captured image data and the second captured image data are image data obtained by imaging at the same time.

In the imaging apparatus 10 according to the first embodiment, the degree of difference between the first captured image data and the second captured image data is a degree of difference in high-order n bits between the first captured image data and the second captured image data.

Accordingly, the imaging apparatus 10 according to the first embodiment can decide the degree of difference between the first captured image data and the second captured image data more quickly than in a case where all bits of the first captured image data and the second captured image data are compared.

In the imaging apparatus 10 according to the first embodiment, the first captured image data and the second captured image data are image data having the same number of bits, and the compressed image data has 7 bits less than 12 bits. The high-order n bits are bits corresponding to a value obtained by subtracting 7 bits from 12 bits, that is, 5 bits.

Accordingly, the imaging apparatus 10 according to the first embodiment can decide the degree of difference between the first captured image data and the second captured image data with higher accuracy than in a case where the degree of difference between the first captured image data and the second captured image data is decided by comparing the first captured image data with the second captured image data in bits not related to the bits of the compressed image data.

Furthermore, in the imaging apparatus 10 according to the first embodiment, the laminated CMOS image sensor is employed as the imaging element 20.

Accordingly, the imaging apparatus 10 according to the first embodiment can decide the degree of difference between the first captured image data and the second captured image data more quickly than in a case where an imaging element of a type in which the memory 96 is not laminated with the photoelectric conversion element 92 is used.

In the first embodiment, an example of a form in which the number of bits of the first captured image data of one frame stored in the memory 96 is 12 bits and the compressed image data of 7 bits is generated is illustratively described. However, the technology of the present disclosure is not limited thereto. For example, as illustrated in FIG. 11, the compressed image data of 9 bits may be generated from the first captured image of 16 bits. In this case, the high-order n bits used in processing of step S104 illustrated in FIG. 7 are 7 bits obtained by subtracting 9 bits of the compressed image data from 16 bits of the first captured image. Alternatively, the compressed image data of 7 bits may be generated from the first captured image of 14 bits. In this case, the high-order n bits used in processing of step S104 illustrated in FIG. 7 are 7 bits obtained by subtracting 7 bits of the compressed image data from 14 bits of the first captured image. Alternatively, the compressed image data of 7 bits may be generated from the first captured image of 12 bits. In this case, the high-order n bits used in processing of step S104 illustrated in FIG. 7 are 5 bits obtained by subtracting 7 bits of the compressed image data from 12 bits of the first captured image. Furthermore, the compressed image data of 6 bits may be generated from the first captured image of 10 bits. In this case, the high-order n bits used in processing of step S104 illustrated in FIG. 7 are 4 bits obtained by subtracting 6 bits of the compressed image data from 10 bits of the first captured image.

While one line of interest is used in the first embodiment, the technology of the present disclosure is not limited thereto. For example, a plurality of lines of interest may be used.

In the first embodiment, an example of a form in which the first captured image data and the second captured image data are compared in units of lines by the image processing circuit 94C after the first and second captured image data of one frame are stored in the memory 96 is described. However, the technology of the present disclosure is not limited thereto. That is, comparison between the first captured image data and the second captured image data in step S104 illustrated in FIG. 7 may be performed before the first captured image data of one frame is stored in the memory 96.

In this case, for example, the first captured image data is compressed in accordance with the degree of difference between the first captured image data and the second captured image data in units of lines each time the first captured image data is read out from the photoelectric conversion element 92 in units of lines by the processing circuit 94 that is one example of a "reading portion" according to the embodiment of the technology of the present disclosure. Accordingly, the imaging apparatus 10 can output the compressed image data more quickly than in a case where the degree of difference between the first captured image data and the second captured image data is decided after waiting for the first captured image data to be read out in units of frames. For example, the "degree of difference" here corresponds to the determination result of step S104 illustrated in FIG. 7. In addition, the "units of lines" here may be one line or a plurality of lines.

While the captured image data that is earlier than the first captured image data by one frame is employed as the second captured image data in the first embodiment, the technology of the present disclosure is not limited thereto. For example, the second captured image data may be the captured image data that is earlier than the first captured image data by a plurality of frames.

Second Embodiment

While an example of a form in which the compressed pixel data Do is simply generated for each line of interest is illustratively described in the first embodiment, an example of a form in which high-order bits of the compressed image data and low-order bits of the compressed image data can be specified for each line will be described in a second embodiment. In the second embodiment, the same constituents as the first embodiment will be designated by the same reference signs and will not be described.

Figure 12:
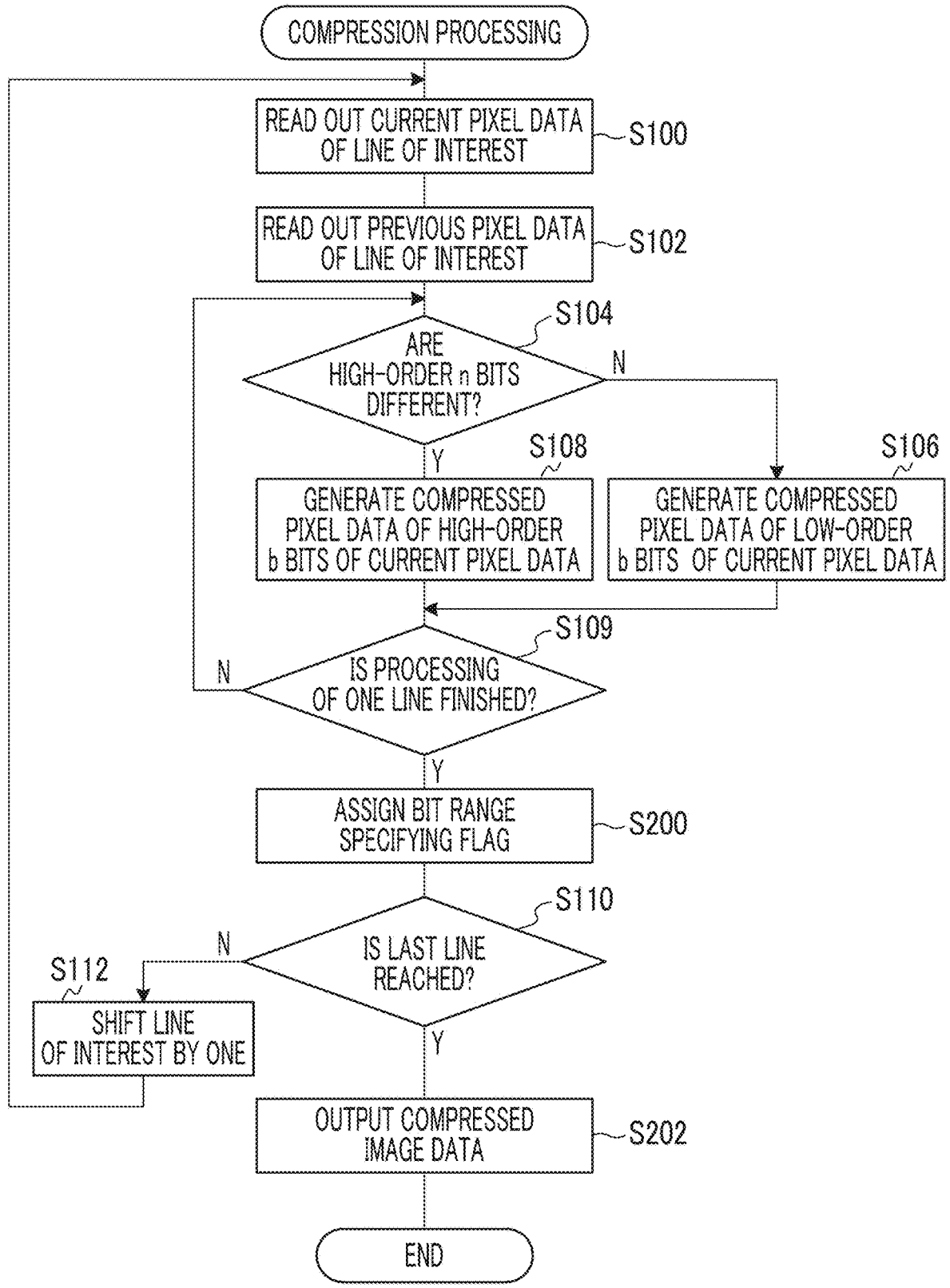
FIG. 12 is a flowchart illustrating one example of a flow of compression processing according to the second embodiment.

The imaging apparatus 10 according to the second embodiment is different from the imaging apparatus 10 according to the first embodiment in that the image processing circuit 94C executes the compression processing illustrated in FIG. 12 instead of the compression processing illustrated in FIG. 7.

Therefore, the compression processing executed by the image processing circuit 94C according to the second embodiment will be described with reference to FIG. 12.

The compression processing illustrated in FIG. 12 is different from the compression processing illustrated in FIG. 7 in that processing of step S200 is included, and that processing of step S202 is included instead of processing of step S114.

In the compression processing illustrated in FIG. 12, in a case where a positive determination is made in step S109, the compression processing transitions to step S200.

In step S200, the image processing circuit 94C assigns a bit range specifying flag to the highest-order 2 bits of the compressed image data of one line that is the compressed pixel data Do of all pixels of the line of interest, and then, the compression processing transitions to step S110. The bit range specifying flag is one example of "bit image specifying information" and "divided image specifying information" according to the embodiment of the technology of the present disclosure.

The compressed image data to which the bit range specifying flag is assigned is generated by executing processing of step S200 by the image processing circuit 94C. The generated compressed image data is one example of "data based on one piece of bit image data that is decided in accordance with a degree of difference among a plurality of bits obtained by dividing the first captured image data into a plurality of bit ranges" according to the embodiment of the technology of the present disclosure. In addition, the generated compressed image data is one example of "data based on any divided image data of a plurality of pieces of divided image data obtained by dividing the first captured image data into a plurality of bit ranges".

The bit range specifying flag is broadly classified into a high-order bit specifying flag and a low-order bit specifying flag. The high-order bit specifying flag refers to a flag capable of specifying high-order bit compressed image data.

For example, the high-order bit compressed image data refers to the compressed image data of one line in which the pixel data of more than a half of the pixels is the high-order b bits of the compressed pixel data Do. The low-order bit specifying flag refers to a flag capable of specifying low-order bit compressed image data. For example, the low-order bit compressed image data refers to the compressed image data of one line in which the pixel data of more than a half of the pixels is the low-order b bits of the compressed pixel data Do. Hereinafter, for convenience of description, the high-order bit compressed image data and the low-order bit compressed image data will be referred to as "bit compressed image data" unless otherwise necessary to distinguish therebetween for description.

The high-order bit compressed image data and the low-order bit compressed image data are one example of a "plurality of pieces of bit image data" and a "plurality of pieces of divided image data" according to the embodiment of the technology of the present disclosure. In addition, the high-order bit compressed image data is one example of "high-order bit image data" according to the embodiment of the technology of the present disclosure. Furthermore, the low-order bit compressed image data is one example of "low-order bit image data" according to the embodiment of the technology of the present disclosure.

Figure 13:
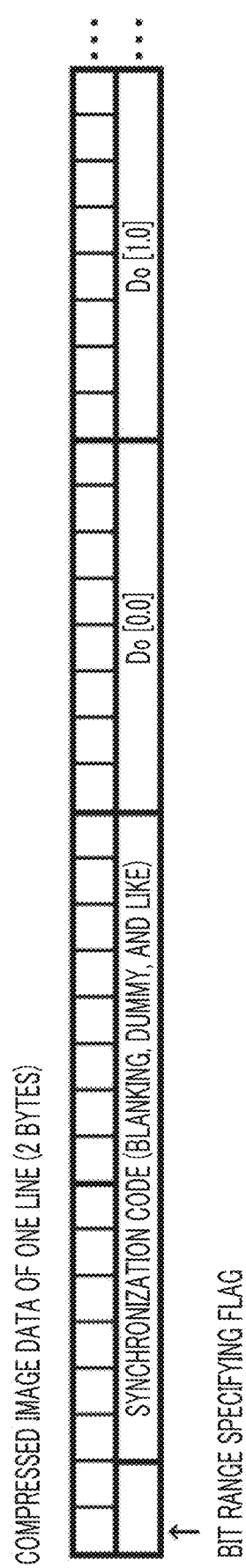
FIG. 13 is a schematic configuration diagram illustrating one example of a configuration of compressed image data of one line.

In the example illustrated in FIG. 13, the bit range specifying flag is assigned to the highest-order 2 bits of the compressed image data of one line of 2 bytes. For example, in the compressed image data of one line illustrated in FIG. 13, the bit range specifying flag is assigned to the highest-order 2 bits, and a synchronization code such as blanking and a dummy and the compressed pixel data Do of each pixel continue subsequent to the bit range specifying flag. For example, "00" is illustrated as the high-order bit specifying flag assigned to the highest-order 2 bits of the compressed image data of one line illustrated in FIG. 13, and, for example, "01" is illustrated as the low-order bit specifying flag. That is, the compressed image data of one line in which "00" is assigned to the highest-order 2 bits is handled as a high-order compressed image, and the compressed image data of one line in which "01" is assigned to the highest-order 2 bits is handled as a low-order bit compressed image.

In step S202, the image processing circuit 94C outputs the compressed image data of one frame to the output circuit 94D using, as the compressed image data of one frame, the compressed image data of a plurality of lines to each of which the bit range specifying flag is assigned, and the image processing circuit 94C finishes the compression processing.

The compressed image data output by executing processing of step S202 is one example of the "processed image data", the "data based on bit image data", and the "data based on the divided image data" according to the embodiment of the technology of the present disclosure.

In step S202, the image processing circuit 94C may perform a specific type of image processing on the compressed image data. In this case, processed compressed image data obtained by performing the specific type of image processing on the compressed image data is output to the output circuit 94D. The "processed compressed image data" here is one example of the "processed image data", the "data based on one piece of bit image data", and the "data based on the divided image data" according to the embodiment of the technology of the present disclosure.

As described above, in the imaging apparatus 10 according to the second embodiment, the compressed image data is one piece of bit compressed image data that is decided in accordance with the degree of difference out of the high-order bit compressed image data and the low-order bit compressed image data obtained by dividing the first captured image data into a plurality of bit ranges. For example, the "degree of difference" here is the determination result of step S104.

Accordingly, the imaging apparatus 10 according to the second embodiment can reduce power consumption accompanied by outputting the image data, compared to a case of outputting all bits of the first captured image data.

In the imaging apparatus 10, the highest-order 2 bits of the compressed image data are bits to which the bit range specifying flag is assigned.

Accordingly, the imaging apparatus 10 according to the second embodiment can specify any bit compressed image data on which data of the compressed image data is based, more quickly in the rear stage circuit 90 than in a case where the bit range specifying flag is output to the rear stage circuit 90 at a timing different from an output timing of the compressed image data.

Furthermore, in the imaging apparatus 10 according to the second embodiment, the compressed image data is generated for each line by executing processing of step S104 to step S109. The compressed image data includes the bit range specifying flag.

Accordingly, the imaging apparatus 10 according to the second embodiment can specify any bit compressed image data to which the compressed image data corresponds for each line.

While an example of a form in which the bit range specifying flag is assigned to the highest-order 2 bits of the compressed image data is illustratively described in the second embodiment, the technology of the present disclosure is not limited thereto. For example, the bit range specifying flag may be assigned to the lowest-order 2 bits of the compressed image data, or the bit range specifying flag may be assigned to specifiable 2 bits in the compressed image data. Alternatively, for example, specific one bit in the compressed image data may be used as a bit to which the bit range specifying flag is assigned. The point is that a bit of a part of the compressed image data may be used as the bit to which the bit range specifying flag is assigned.

While whether or not the high-order n bits of the current pixel data Dn and the previous pixel data Dp are different is determined in step S104 in the second embodiment, the technology of the present disclosure is not limited thereto. In step S104, whether or not a degree of difference in high-order n bits between the current pixel data Dn and the previous pixel data Dp satisfies a predetermined condition may be determined. In this case, the compressed pixel data Do generated by executing processing of step S106 is one example of "data based on the low-order bit image data" according to the embodiment of the technology of the present disclosure. In addition, the compressed pixel data Do generated by executing processing of step S108 is one example of "data based on the high-order bit image data" according to the embodiment of the technology of the present disclosure.

For example, in a case where an absolute value of a difference in high-order n bits between the current pixel data Dn and the previous pixel data Dp is greater than or equal to a threshold value, processing of step S108 is executed. In a case where the absolute value of the difference in high-order n bits between the current pixel data Dn and the previous pixel data Dp is less than the threshold value, processing of step S106 is executed. Accordingly, a degree of suppressing a decrease in image quality and a degree of suppressing power consumption are adjusted in accordance with a motion of the subject, compared to a case where all bits of the first captured image data are output regardless of the motion of the subject. The "difference" here is one example of the "degree of difference" according to the embodiment of the technology of the present disclosure. The "case of being greater than or equal to the threshold value" here is one example of a "case of satisfying a predetermined condition" according to the embodiment of the technology of the present disclosure, and the "case of being less than the threshold value" is one example of a "case of not satisfying the predetermined condition" according to the embodiment of the technology of the present disclosure. The threshold value may be a fixed value or may be a variable value that is variable in accordance with an instruction received by the touch panel 42 and/or the operation portion 54.

In the second embodiment, the compressed pixel data is generated by comparing the high-order n bits between the current pixel data Dn of the most recent frame and the previous pixel data Dp earlier by one frame for each of all pixels of the line of interest. However, the technology of the present disclosure is not limited thereto. For example, by using all pixels of the line of interest as a target, processing of step S106 may be executed for each of all pixels of the line of interest in a case where an average value of the high-order n bits of the current pixel data Dn of the most recent frame matches an average value of the high-order n bits of the previous pixel data Dp earlier by one frame. In this case, by using all pixels of the line of interest as a target, processing of step S108 is also executed for each of all pixels of the line of interest in a case where the average value of the high-order n bits of the current pixel data Dn of the most recent frame is different from the average value of the high-order n bits of the previous pixel data Dp earlier by one frame.

In the present embodiment, "matching" means not only complete matching but also matching within predetermined error as allowable error. For example, as the "predetermined error" here, a value that is derived in advance, by sensory test using an actual apparatus and/or computer simulation, as error with which a change in subject is not visually recognized is employed.

In addition, for example, in the line of interest, processing of step S106 may be executed for each of all pixels of the line of interest in a case where representative pixel data of the high-order n bits of the current pixel data Dn of the most recent frame matches representative pixel data of the high-order n bits of the previous pixel data Dp earlier by one frame. In this case, in the line of interest, processing of step S108 is also executed for each of all pixels of the line of interest in a case where the representative pixel data of the high-order n bits of the current pixel data Dn of the most recent frame is different from the representative pixel data of the high-order n bits of the previous pixel data Dp earlier by one frame.

Furthermore, for example, in the line of interest, processing of step S106 may be executed for each of all pixels of the line of interest in a case where a total sum of pixel data of the high-order n bits of the current pixel data Dn of the most recent frame matches a total sum of pixel data of the high-order n bits of the previous pixel data Dp earlier by one frame. In this case, in the line of interest, processing of step S108 is also executed for each of all pixels of the line of interest in a case where the total sum of the pixel data of the high-order n bits of the current pixel data Dn of the most recent frame is different from the total sum of the pixel data of the high-order n bits of the previous pixel data Dp earlier by one frame.

In the second embodiment, the compressed image data of one line in which the pixel data of more than a half of the pixels is the high-order b bits of the compressed pixel data Do is illustrated as the high-order bit compressed image data. However, the technology of the present disclosure is not limited thereto. For example, in a case where the average value of the high-order n bits of the previous pixel data Dp matches the average value of the high-order n bits of the current pixel data Dn in the line of interest, the compressed image data of the line of interest may be used as the high-order bit compressed image data. In a case where the average pixel value of the high-order n bits of the previous pixel data Dp is different from the average pixel value of the high-order n bits of the current pixel data Dn in the line of interest, the compressed image data of the line of interest may be used as the low-order bit compressed image data.

In addition, for example, in a case where the representative pixel data of the high-order n bits of the previous pixel data Dp matches the representative pixel data of the high-order n bits of the current pixel data Dn in the line of interest, the compressed image data of the line of interest may be used as the high-order bit compressed image data. In a case where the representative pixel data of the high-order n bits of the previous pixel data Dp is different from the representative pixel data of the high-order n bits of the current pixel data Dn in the line of interest, the compressed image data of the line of interest may be used as the low-order bit compressed image data.

Furthermore, for example, in a case where the total sum of the pixel data of the high-order n bits of the previous pixel data Dp matches the total sum of the pixel data of the high-order n bits of the current pixel data Dn in the line of interest, the compressed image data of the line of interest may be used as the high-order bit compressed image data. In a case where the total sum of the pixel data of the high-order n bits of the previous pixel data Dp is different from the total sum of the pixel data of the high-order n bits of the current pixel data Dn in the line of interest, the compressed image data of the line of interest may be used as the low-order bit compressed image data.

In the second embodiment, the high-order bit compressed image data and the low-order bit compressed image data are illustrated as one example of the "plurality of pieces of bit image data" and the "plurality of pieces of divided image data" according to the embodiment of the technology of the present disclosure. However, the technology of the present disclosure is not limited thereto. Three or more pieces of bit compressed image data may be employed as the "plurality of pieces of bit image data" and the "plurality of pieces of divided image data" according to the embodiment of the technology of the present disclosure.

Figure 14:
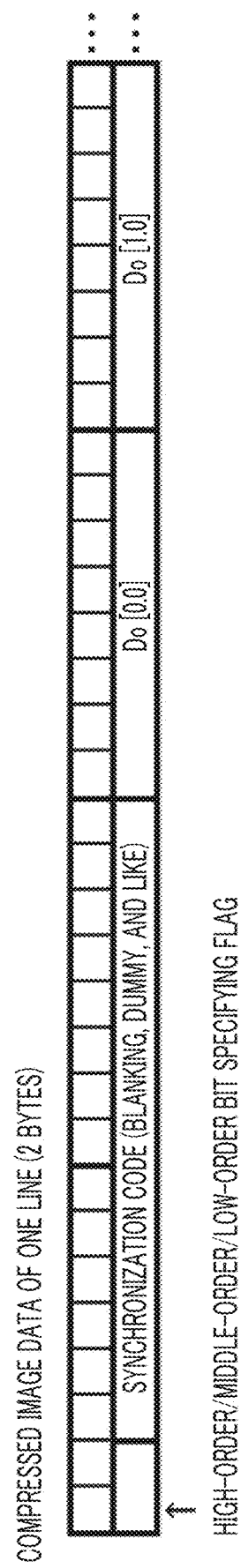
FIG. 14 is a schematic configuration diagram illustrating a modification example of the configuration of the compressed image data of one line.

In this case, for example, the high-order bit compressed image data, middle-order bit compressed image data, and the low-order bit compressed image data are illustrated. The high-order bit compressed image data, the middle-order bit compressed image data, and the low-order bit compressed image data are obtained by dividing the first captured image data into three bit ranges of high-order bits, middle-order bits, and low-order bits. In this case, for example, as illustrated in FIG. 14, the high-order bit specifying flag, a middle-order bit specifying flag, or the low-order bit specifying flag is assigned to the highest-order 2 bits of the compressed image data of the line of interest. The high-order bit compressed image data is obtained by assigning the high-order bit specifying flag to the highest-order 2 bits of the compressed image data of the line of interest. The middle-order bit compressed image data is obtained by assigning the middle-order bit specifying flag to the highest-order 2 bits of the compressed image data of the line of interest. The low-order bit compressed image data is obtained by assigning the low-order bit specifying flag to the highest-order 2 bits of the compressed image data of the line of interest. In a case where the high-order bit specifying flag is "00" and the low-order bit specifying flag is "01" as described above, "10" or "11" is illustrated as the middle-order bit specifying flag.

While the compressed image data illustrated in step S202 is the compressed image data of the plurality of lines in the second embodiment, the compressed image data of each line does not need to be used. For example, the compressed image data illustrated in step S202 may include the processed compressed image data obtained by performing a specific type of image processing on the compressed image data of at least one line in the compressed image data of the plurality of lines.

Third Embodiment

While an example of a form in which the pixel data is compared in units of lines is illustratively described in the first and second embodiments, a case where the pixel data is compared for each pixel will be described in a third embodiment. In the third embodiment, the same constituents as constituents described in the first embodiment will be designated by the same reference signs and will not be described.

Figure 15:
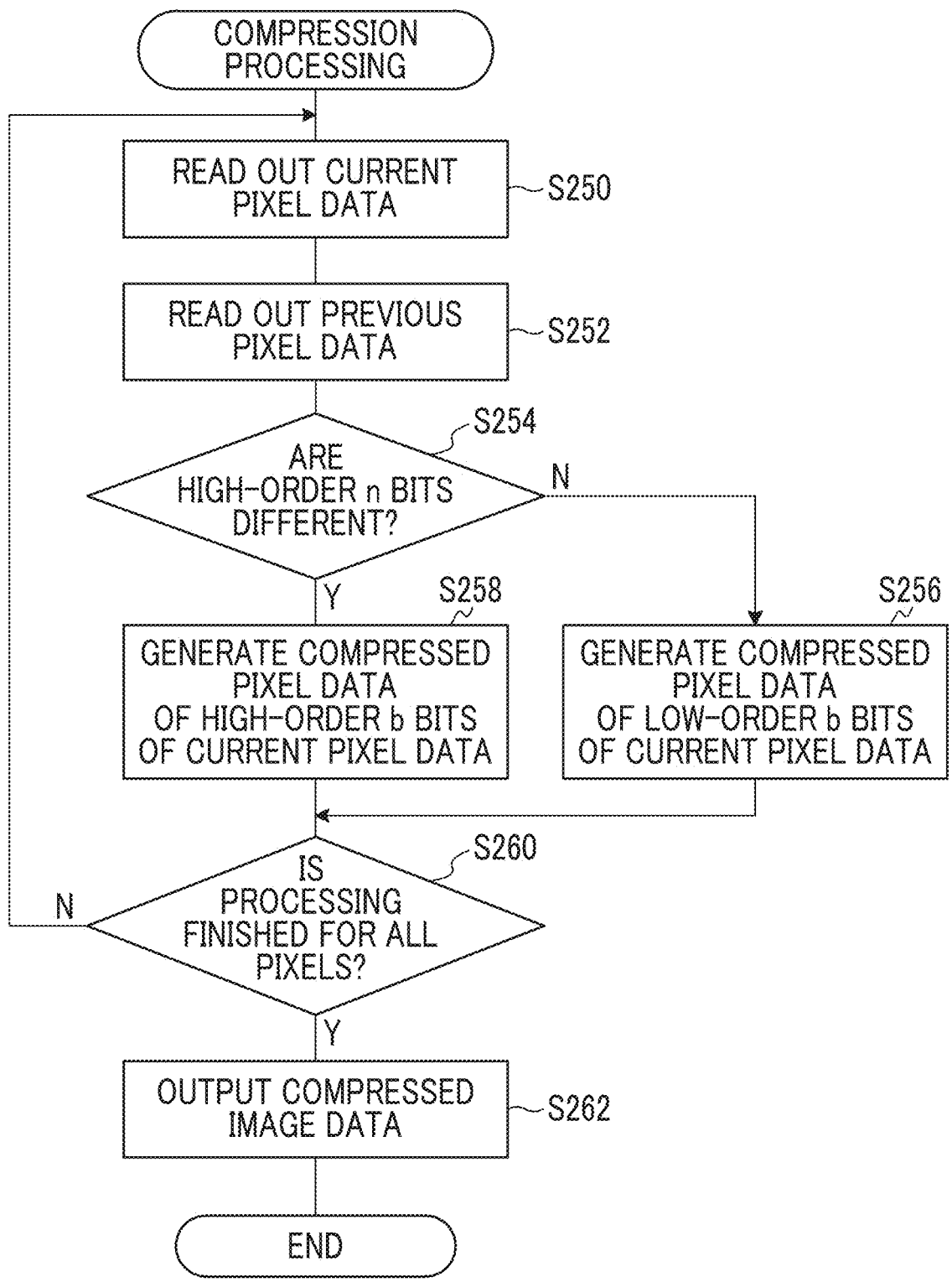
FIG. 15 is a flowchart illustrating one example of a flow of compression processing according to the third embodiment.

The imaging apparatus 10 according to the third embodiment is different from the imaging apparatus 10 according to the first embodiment in that the image processing circuit 94C executes the compression processing illustrated in FIG. 15 instead of the compression processing illustrated in FIG. 7.

Therefore, the compression processing executed by the image processing circuit 94C according to the third embodiment will be described with reference to FIG. 15.

In the compression processing illustrated in FIG. 15, in step S250, the image processing circuit 94C reads out non-processed current pixel data Dn among all pixels of the first captured image from the memory 96, and then, the compression processing transitions to step S252. The "non-processed current pixel data Dn" refers to the current pixel data Dn that is not used yet in processing of step S254 described later.

In step S252, the image processing circuit 94C reads out non-processed previous pixel data Dp among all pixels of the second captured image from the memory 96, and then, the compression processing transitions to step S254.

In step S254, the image processing circuit 94C compares the high-order n bits between the current pixel data Dn read out in step S250 and the previous pixel data Dp read out in step S252. The image processing circuit 94C determines whether or not the high-order n bits are different between the current pixel data Dn and the previous pixel data Dp.

In step S254, in a case where the high-order n bits of the current pixel data Dn and the previous pixel data Dp are the same, a negative determination is made, and the compression processing transitions to step S256. In step S254, in a case where the high-order n bits of the current pixel data Dn and the previous pixel data Dp are different, a positive determination is made, and the compression processing transitions to step S258.

In step S256, the image processing circuit 94C generates the compressed pixel data Do of the low-order b bits of the current pixel data Dn, and then, the compression processing transitions to step S260.

In step S258, the image processing circuit 94C generates the compressed pixel data Do of the high-order b bits of the current pixel data Dn, and then, the compression processing transitions to step S260.

In step S260, the image processing circuit 94C determines whether or not processing is finished for all pixels. In step S260, for example, the image processing circuit 94C determines whether or not the pixel data of all pixels included in the first captured image and the second captured image are used in processing of step S254.

In step S260, in a case where processing is not finished for all pixels, a negative determination is made, and the compression processing transitions to step S250. In step S260, in a case where processing is finished for all pixels, a positive determination is made, and the compression processing transitions to step S262.

In step S262, the image processing circuit 94C outputs the compressed image data of one frame to the output circuit 94D by using the compressed pixel data Do of all pixels obtained by executing processing of step S256 or step S258 as the compressed image data of one frame, and the image processing circuit 94C finishes the compression processing.

The compressed image data output by executing processing of step S262 is one example of the "processed image data", the "data based on bit image data", and the "data based on the divided image data" according to the embodiment of the technology of the present disclosure.

In step S262, the image processing circuit 94C may perform a specific type of image processing on the compressed image data. In this case, processed compressed image data obtained by performing the specific type of image processing on the compressed image data is output to the output circuit 94D. The "processed compressed image data" here is one example of the "processed image data", the "data based on one piece of bit image data", and the "data based on the divided image data" according to the embodiment of the technology of the present disclosure.

As described above, in the imaging apparatus 10 according to the third embodiment, processing of step S250 to step S258 illustrated in FIG. 15 is executed for each pixel, and the compressed image data of one frame is generated in step S262 in the same manner as the first embodiment.

Accordingly, even in the imaging apparatus 10 according to the third embodiment, power consumption accompanied by outputting the image data to the outside of the imaging element 20 can be reduced in the same manner as the imaging apparatus 10 according to the first embodiment, compared to a case where the first captured image data obtained by imaging is output to the outside of the imaging element 20.

Fourth Embodiment

While an example of a form in which the compressed pixel data Do of the pixel of interest is simply generated is illustratively described in the third embodiment, an example of a form in which the high-order bits of the compressed pixel data and the low-order bits of the compressed pixel data can be specified for pixel will be described in a fourth embodiment. In the fourth embodiment, the same constituents as the first embodiment will be designated by the same reference signs and will not be described.

Figure 16:
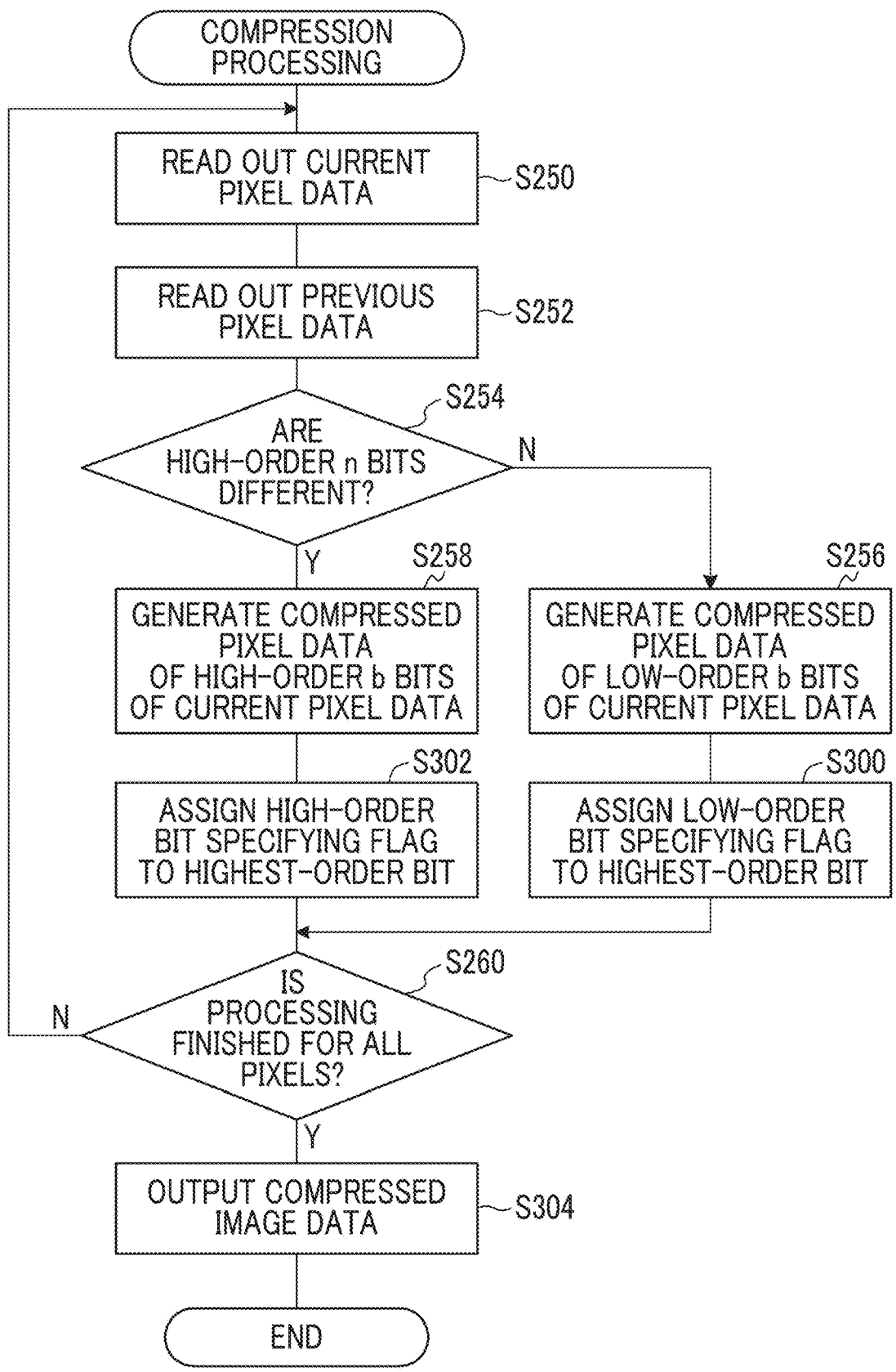
FIG. 16 is a flowchart illustrating one example of a flow of compression processing according to the fourth embodiment.

The imaging apparatus 10 according to the fourth embodiment is different from the imaging apparatus 10 according to the third embodiment in that the image processing circuit 94C executes the compression processing illustrated in FIG. 16 instead of the compression processing illustrated in FIG. 15.

Therefore, the compression processing executed by the image processing circuit 94C according to the fourth embodiment will be described with reference to FIG. 16.

The compression processing illustrated in FIG. 16 is different from the compression processing illustrated in FIG. 15 in that processing of steps S300 and S302 is included, and that processing of step S304 is included instead of processing of step S262.

In the compression processing illustrated in FIG. 16, the compression processing transitions to step S300 after processing of step S256 is executed.

In step S300, the image processing circuit 94C assigns the low-order bit specifying flag to the highest-order bit of the compressed pixel data Do generated in step S256, and then, the compression processing transitions to step S260. For example, the low-order bit specifying flag used in step S300 is "0" as illustrated in FIG. 17.

In step S302, the image processing circuit 94C assigns the high-order bit specifying flag to the highest-order bit of the compressed pixel data Do generated in step S256, and then, the compression processing transitions to step S260. For example, the high-order bit specifying flag used in step S302 is "1" as illustrated in FIG. 17.

In the example illustrated in FIG. 17, "0" is illustrated as the low-order bit specifying flag, and "1" is illustrated as the high-order bit specifying flag. However, the technology of the present disclosure is not limited thereto. For example, "1" may be employed as the low-order bit specifying flag, and "0" may be employed as the high-order bit specifying flag.

In a case where a positive determination is made in step S260, the compression processing transitions to step S304. In step S304, the image processing circuit 94C outputs the compressed image data of one frame to the output circuit 94D using, as the compressed image data of one frame, the compressed image data of all pixels to each of which the bit range specifying flag is assigned, and the image processing circuit 94C finishes the compression processing.

The compressed image data output by executing processing of step S304 is one example of the "processed image data", the "data based on bit image data", and the "data based on the divided image data" according to the embodiment of the technology of the present disclosure.

In step S304, the image processing circuit 94C may perform a specific type of image processing on the compressed image data. In this case, processed compressed image data obtained by performing the specific type of image processing on the compressed image data is output to the output circuit 94D. The "processed compressed image data" here is one example of the "processed image data", the "data based on one piece of bit image data", and the "data based on the divided image data" according to the embodiment of the technology of the present disclosure.

As described above, while the bit range specifying flag is assigned to the compressed image data in units of lines in the imaging apparatus 10 according to the third embodiment, the bit range specifying flag is assigned to the compressed pixel data Do in units of pixels in the imaging apparatus 10 according to the fourth embodiment.

Accordingly, the imaging apparatus 10 according to the fourth embodiment can specify, for each pixel, any bit range to which the compressed pixel data Do belongs among a plurality of bit ranges.

The pixel data is compared in units of lines in the first and second embodiments, and the pixel data is compared for each pixel in the third and fourth embodiments. However, the technology of the present disclosure is not limited thereto, and the first captured image data and the second captured image data may be compared in units of frames. In this case, for example, the compressed image data of each frame may be generated by dividing the first captured image data into a plurality of bit ranges in accordance with the degree of difference between the first captured image data and the second captured image data for each frame. Alternatively, the compressed image data of each frame may be generated in accordance with the degree of difference in high-order n bits between the first captured image data and the second captured image data for each frame.

In this case, for example, the high-order bit compressed image data is generated in a case where the current pixel data Dn and the previous pixel data Dp are different for pixels exceeding more than a half of all pixels. The low-order bit compressed image data is generated in a case where the current pixel data Dn and the previous pixel data Dp match for pixels exceeding more than a half of all pixels.

In addition, in this case, the bit range specifying flag may be assigned to the compressed image data in units of frames.

In each embodiment above, whether or not the current pixel data Dn and the previous pixel data Dp are different is determined in accordance with the difference between the current pixel data Dn and the previous pixel data Dp. However, the technology of the present disclosure is not limited thereto. Whether or not the current pixel data Dn and the previous pixel data Dp are different may be determined in accordance with a ratio of one of the current pixel data Dn and the previous pixel data Dp to the other, a sum of the current pixel data Dn and the previous pixel data Dp, and a product of the current pixel data Dn and the previous pixel data Dp. The same applies to not only comparison in units of pixels but also comparison in units of lines between the first captured image and the second captured image as a target and comparison in units of frames.

Figure 19:
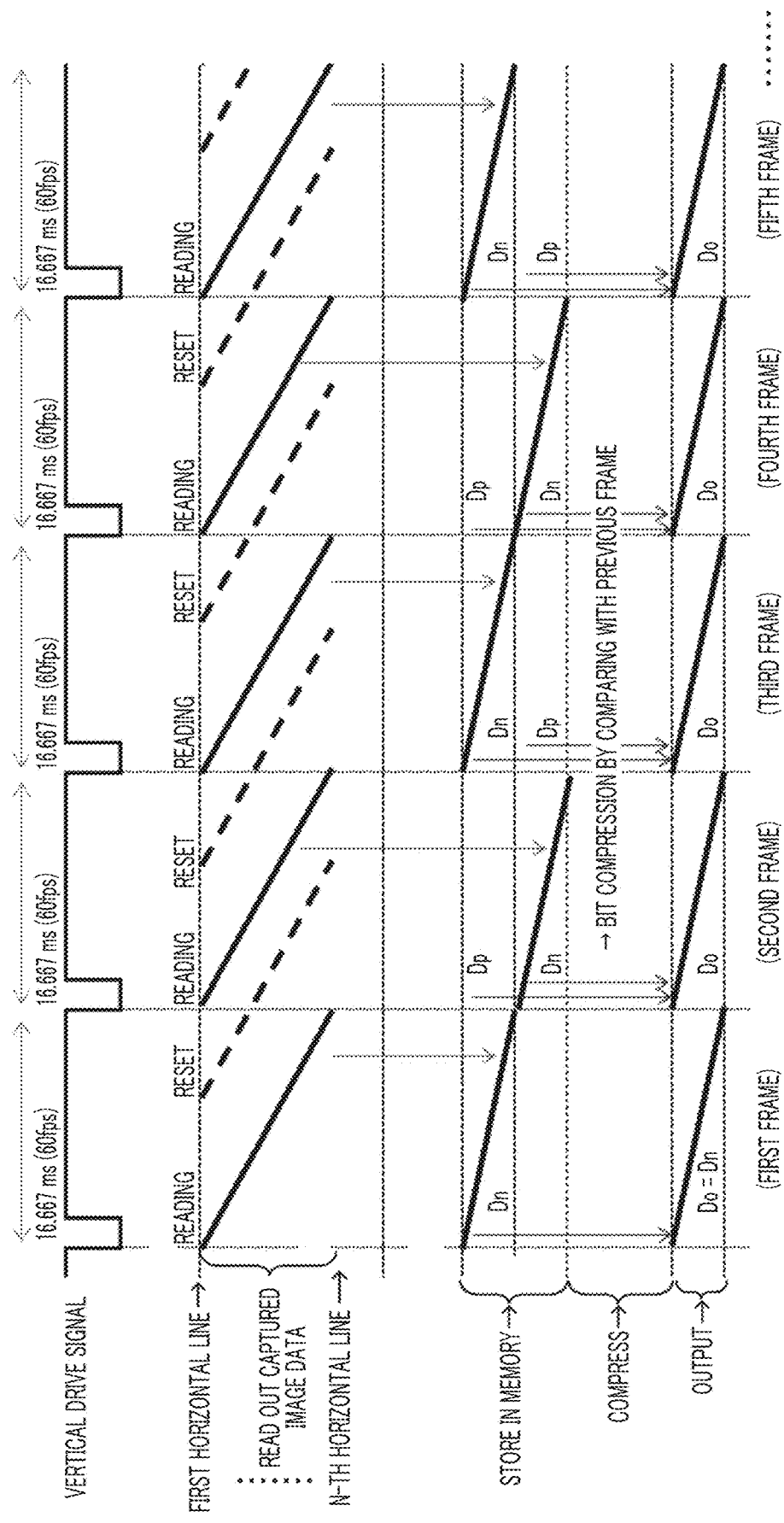
FIG. 19 is a state transition diagram illustrating a second example of the flow of image data in a case where the compression processing and the image data output processing are executed.

In each embodiment above, the captured image data of a first frame is not output to the I/F 56 of the rear stage circuit 90 in a case where imaging related to the live view image or the motion picture for recording is started. However, the technology of the present disclosure is not limited thereto. In a case where imaging related to the live view image or the motion picture for recording is started, the first captured image data may be output to the I/F 56 of the rear stage circuit 90 by the output circuit 94D before the second captured image data is stored in the memory 96. In the example illustrated in FIG. 19, the first captured image data that is the captured image data of the first frame is output to the I/F 56 of the rear stage circuit 90. Accordingly, a delay in outputting the image data by the output circuit 94D is avoided even before the second captured image data is stored in the memory 96.

Figure 20:
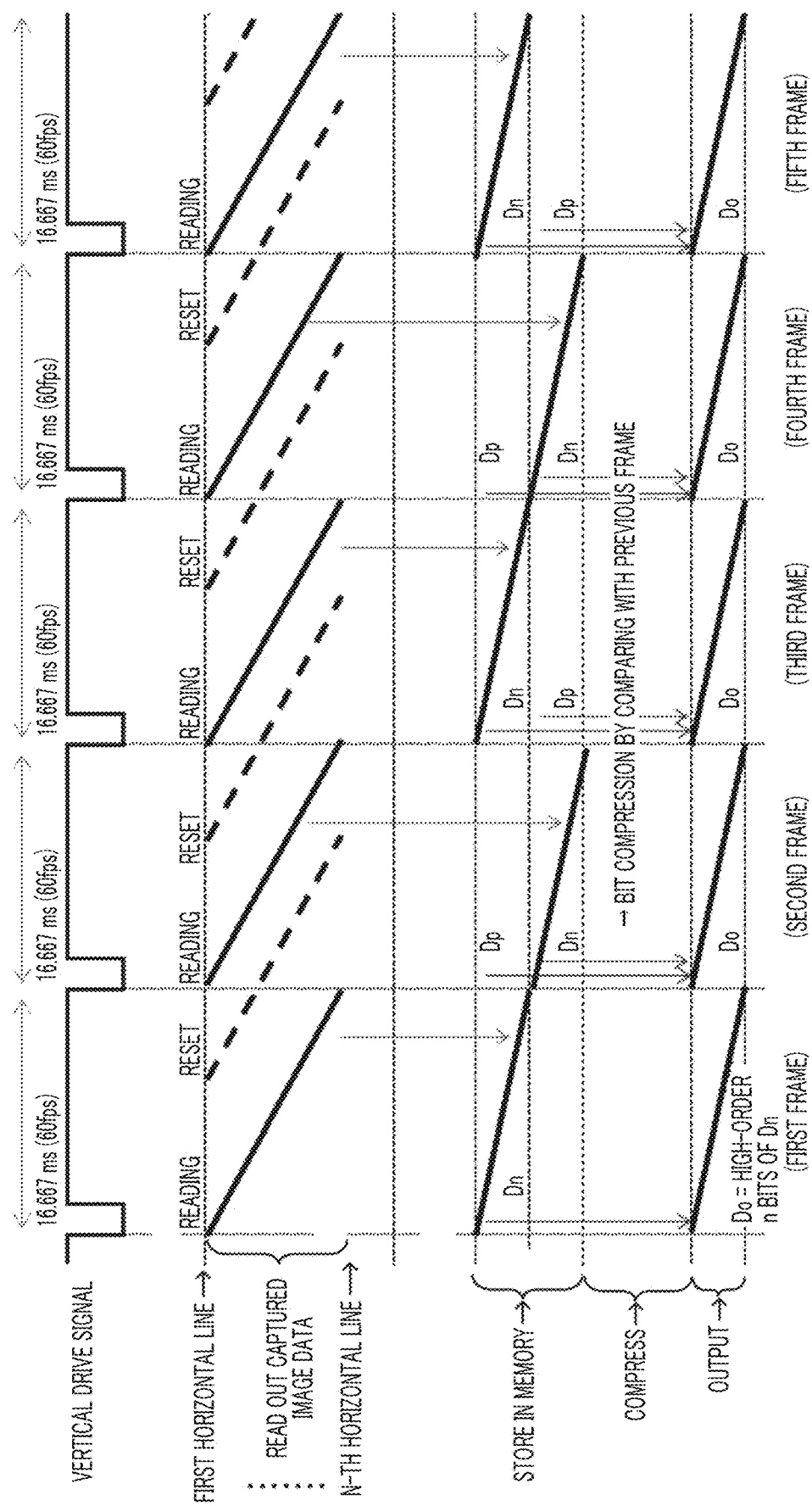
FIG. 20 is a state transition diagram illustrating a third example of the flow of image data in a case where the compression processing and the image data output processing are executed.
Figure 21:
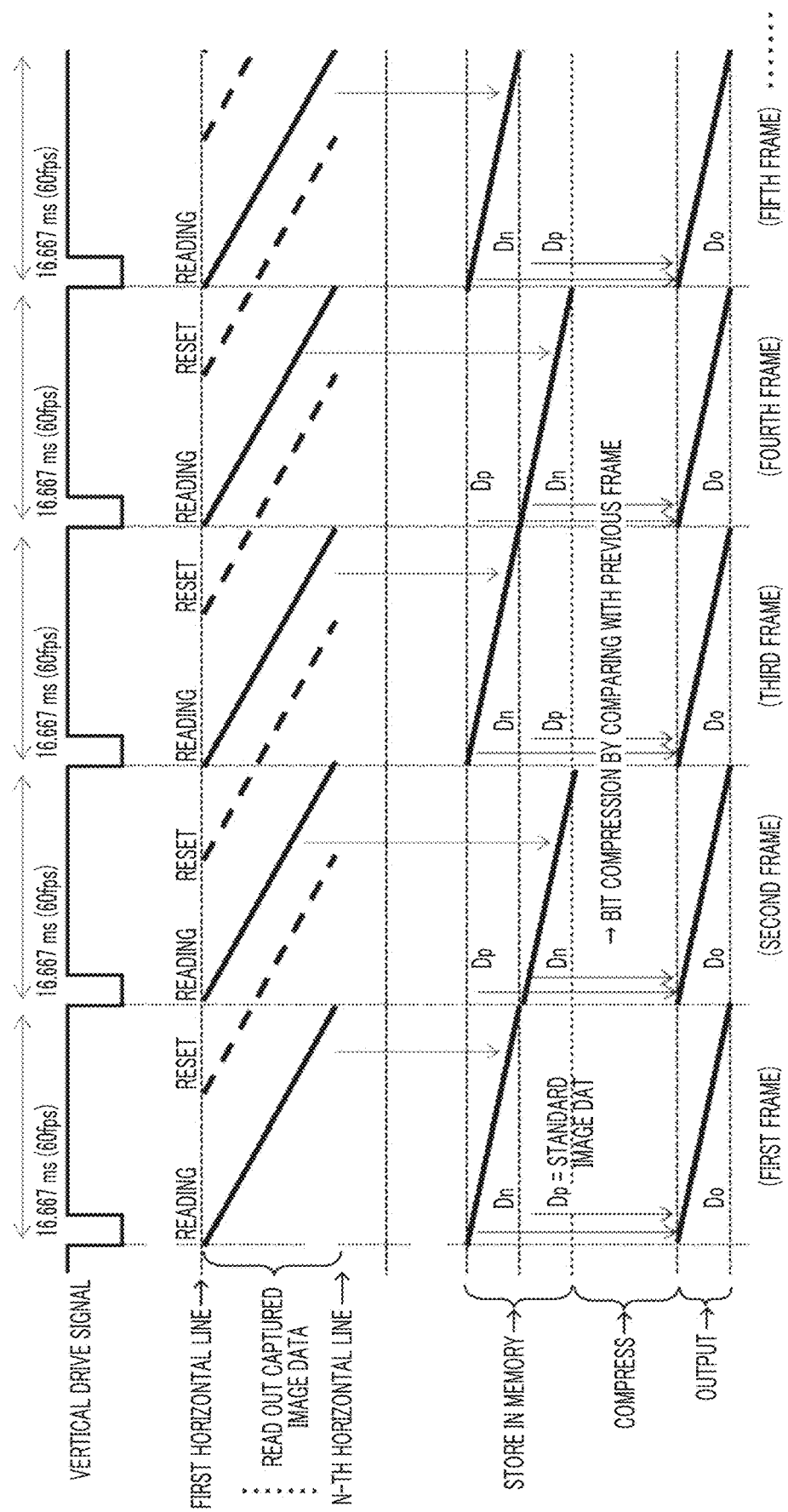
FIG. 21 is a state transition diagram illustrating a fourth example of the flow of image data in a case where the compression processing and the image data output processing are executed.

Alternatively, in a case where imaging related to the live view image or the motion picture for recording is started, data based on image data belonging to a specific bit range in the first captured image data may be output to the I/F 56 of the rear stage circuit 90 by the output circuit 94D before the second captured image data is stored in the memory 96. For example, as illustrated in FIG. 20, the high-order n bits of the first captured image data that is the captured image data of the first frame may be output to the I/F 56 of the rear stage circuit 90 as the compressed image data by the output circuit 94D. Alternatively, image data obtained by performing a specific type of image processing on the high-order n bits of the first captured image data that is the captured image data of the first frame may be output to the I/F 56 of the rear stage circuit 90 as the compressed image data.

Accordingly, power consumption accompanied by outputting the image data by the output circuit 94D is reduced, compared to a case where the first captured image data is output before the second captured image data is stored in the memory 96.

Alternatively, in a case where imaging related to the live view image or the motion picture for recording is started, substituting compressed image data may be output by the output circuit 94D in accordance with a degree of difference between standard image data and the first captured image data before the second captured image data is stored in the memory 96. Accordingly, power consumption accompanied by outputting the image data by the output circuit 94D is reduced, compared to a case where the first captured image data is output before the second captured image data is stored in the memory 96.

The standard image data refers to predetermined image data as image data substituting for the second captured image data. Image data indicating an image of a black level visually recognized as black is illustrated as one example of the predetermined image data. The substituting compressed image data refers to the compressed image data obtained by compressing the first captured image data by dividing the first captured image data into the plurality of bit ranges. The degree of difference between the standard image data and the first captured image data may be a difference or the like between the standard image data and the first captured image data, or may be a difference or the like between the high-order n bits of the standard image data and the first captured image data.

Figure 22:
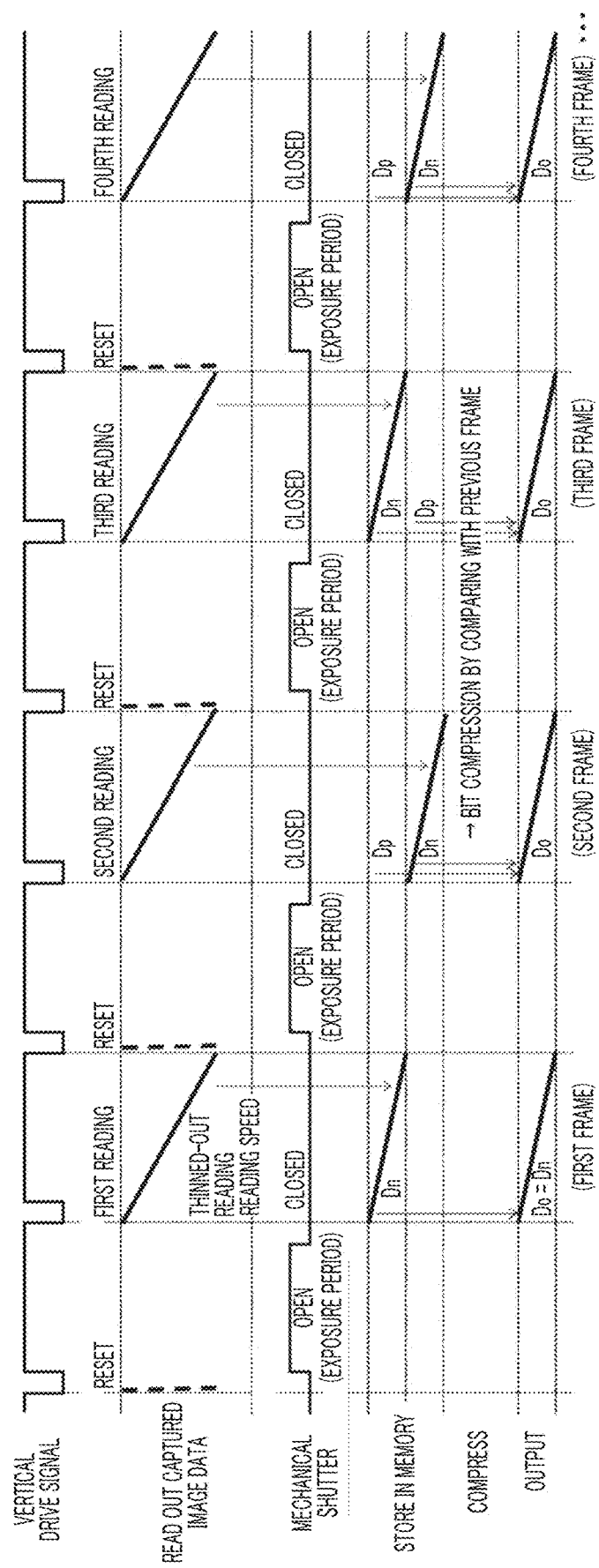
FIG. 22 is a state transition diagram illustrating a fifth example of the flow of image data in a case where the compression processing and the image data output processing are executed.

Alternatively, for example, as illustrated in FIG. 22, in a case where imaging for a still picture is consecutively performed at a predetermined time interval by the photoelectric conversion element 92, the first captured image data may be output by the output circuit 94D before the second captured image data is stored in the memory 96. In this case, the compressed image data is output to the I/F 56 of the rear stage circuit 90 by the output circuit 94D on a condition that the second captured image data is stored in the memory 96. For example in the example illustrated in FIG. 22, the output circuit 94D outputs the first captured image data in the first frame before the second captured image data is stored in the memory 96, and outputs the compressed image data from the second frame. Accordingly, a delay in outputting the image data by the output circuit 94D is avoided even before the second captured image data is stored in the memory 96.

Alternatively, in a case where imaging for the still picture is consecutively performed at the predetermined time interval by the photoelectric conversion element 92, image data belonging to a predetermined bit range in the first captured image data may be output by the output circuit 94D before the second captured image data is stored in the memory 96. Image data of the high-order n bits of the first captured image data is illustrated as one example of the "image data belonging to the predetermined bit range in the first captured image data". In addition, in the example illustrated in FIG. 22, a time interval decided in accordance with a vertical drive signal is employed as the "predetermined time interval". One example of the time interval decided in accordance with the vertical drive signal is illustrated by 16.667 ms corresponding to 60 fps.

While a case where the compressed image data is used for displaying the live view image is described in each embodiment above, the technology of the present disclosure is not limited thereto. For example, by the CPU 52, the compressed image data may be stored in the secondary storage portion 60 in the rear stage circuit 90 or may be output to an outside of the imaging apparatus 10 through the external I/F 63.

While the processing circuit 94 implemented by the ASIC is illustrated in each embodiment above, the compression processing and the image data output processing may be implemented by a computer using a software configuration.

Figure 23:
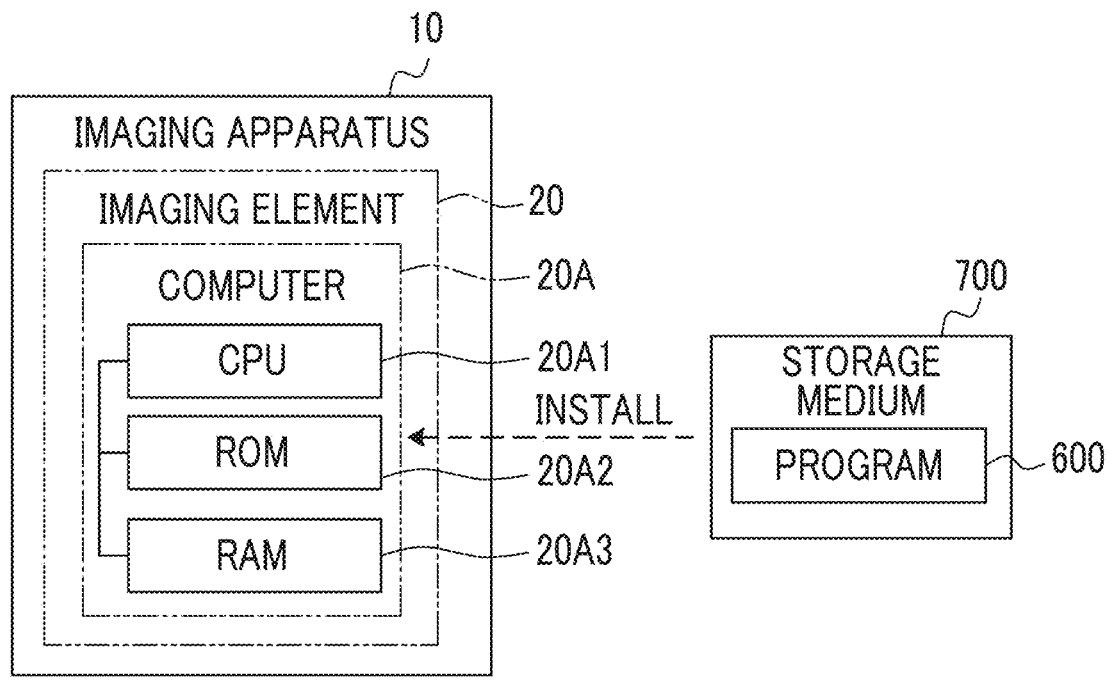
FIG. 23 is a conceptual diagram illustrating one example of a state where a program according to the embodiment is installed on the imaging element from a storage medium storing the program according to the embodiment.

In this case, for example, as illustrated in FIG. 23, a program 600 for causing a computer 20A incorporated in the imaging element 20 to execute the compression processing and the image data output processing is stored in a storage medium 700. The computer 20A comprises a CPU 20A1, a ROM 20A2, and a RAM 20A3. The program 600 of the storage medium 700 is installed on the computer 20A, and the CPU 20A1 of the computer 20A executes the compression processing and the image data output processing in accordance with the program 600. A single CPU is illustrated as the CPU 20A1. However, the technology of the present disclosure is not limited thereto, and a plurality of CPUs may be employed instead of the CPU 20A1. That is, the compression processing and/or the image data output processing may be executed by one processor or a plurality of physically separated processors.

Any portable storage medium such as a solid state drive (SSD) or a universal serial bus (USB) is illustrated as one example of the storage medium 700.

Alternatively, the program 600 may be stored in a storage portion of another computer, a server apparatus, or the like connected to the computer 20A through a communication network (not illustrated), and the program 600 may be downloaded in accordance with a request from the imaging apparatus 10 or the like. In this case, the downloaded program 600 is executed by the computer 20A.

The computer 20A may be disposed outside the imaging element 20. In this case, the computer 20A may control the processing circuit 94 in accordance with the program 600.

Various processors illustrated below can be used as a hardware resource for executing various types of processing described in each embodiment above. Various types of processing described in each embodiment above are illustrated by the compression processing, the image data output processing, and the display control processing. For example, as described above, a CPU that is a general-purpose processor functioning as a hardware resource for executing various types of processing according to the embodiment of the technology of the present disclosure by executing software, that is, the program, is illustrated as a processor. In addition, a dedicated electric circuit such as an FPGA, a PLD, or an ASIC that is a processor having a circuit configuration dedicatedly designed to execute a specific type of processing is illustrated as a processor. A memory is incorporated in or connected to any of the processors, and any of the processors executes various types of processing using the memory.

The hardware resource for executing various types of processing according to the embodiment of the technology of the present disclosure may be configured with one of those various processors or may be configured with a combination of two or more processors of the same type or different types (for example, a combination of a plurality of FPGAs or a combination of a CPU and an FPGA). Alternatively, the hardware resource for executing various types of processing according to the embodiment of the technology of the present disclosure may be one processor.

As an example of a configuration with one processor, first, as represented by a computer such as a client and a server, a form in which one processor is configured with a combination of one or more CPUs and software and this processor functions as the hardware resource for executing various types of processing according to the embodiment of the technology of the present disclosure is available. Second, as represented by a system-on-a-chip (SoC) or the like, a form of using a processor that implements, by one IC chip, a function of the entire system including a plurality of hardware resources for executing various types of processing according to the embodiment of the technology of the present disclosure is available. Accordingly, various types of processing according to the embodiment of the technology of the present disclosure are implemented using one or more of above various processors as a hardware resource.

Furthermore, as a hardware structure of those various processors, more specifically, an electric circuit in which circuit elements such as semiconductor elements are combined can be used.

Figure 24:
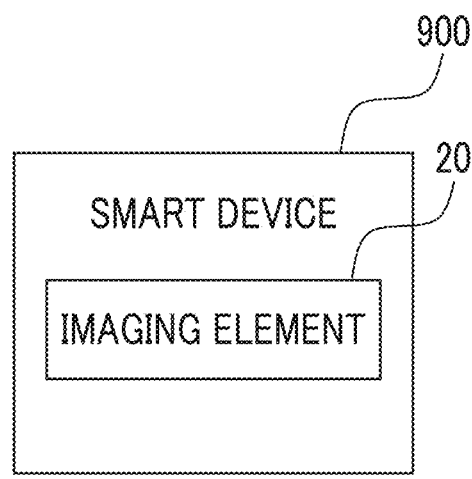
FIG. 24 is a block diagram illustrating one example of a schematic configuration of a smart device in which the imaging element according to the embodiment is incorporated.

While an interchangeable lens camera is illustrated as the imaging apparatus 10 in each embodiment above, the technology of the present disclosure is not limited thereto. For example, the technology of the present disclosure may be applied to a smart device 900 illustrated in FIG. 24. For example, the smart device 900 illustrated in FIG. 24 is one example of the imaging apparatus according to the embodiment of the technology of the present disclosure. The imaging element 20 described in the embodiments is mounted on the smart device 900. Even with the smart device 900 configured in such a manner, the same action and effect as the imaging apparatus 10 described in each embodiment above are achieved. The technology of the present disclosure can be applied to not only the smart device 900 but also a personal computer or a wearable terminal apparatus.

While the first display 40 and the second display 80 are illustrated as the display apparatus in each embodiment above, the technology of the present disclosure is not limited thereto. For example, a separate display that is retrofit into the imaging apparatus main body 12 may be used as the "display portion" according to the embodiment of the technology of the present disclosure.

While an example of a form in which the first captured image data is subjected to the bit compression is illustratively described in each embodiment above, both of the first captured image data and the second captured image data can be subjected to the bit compression, or the second captured image data can be subjected to the bit compression by applying the technology of the present disclosure.

The compression processing, the image data output processing, and the display control processing described in the embodiments are merely one example. Accordingly, unnecessary steps may be removed, new steps may be added, or a processing order may be changed without departing from a gist of the present disclosure.

Above described contents and illustrated contents are detailed description for parts according to the embodiment of the technology of the present disclosure and are merely one example of the technology of the present disclosure. For example, description related to the above configurations, functions, actions, and effects is description related to one example of configurations, functions, actions, and effects of the parts according to the embodiment of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, may be only B, or may be a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

What is claimed is:

1. An imaging element comprising:
    a memory that stores captured image data obtained by imaging a subject at a first frame rate and is incorporated in the imaging element;
    an image processing circuit that performs processing on the captured image data and is incorporated in the imaging element; and
    an output circuit that outputs at least one of the captured image data or processed image data obtained by performing the processing on the captured image data to an outside of the imaging element, and is incorporated in the imaging element,
    wherein the image processing circuit generates, in accordance with a degree of difference between first captured image data obtained by imaging and second captured image data stored in the memory, compressed image data obtained by compressing the first captured image data by dividing the first captured image data into a plurality of bit ranges, and
    the output circuit outputs the compressed image data generated by the image processing circuit to the outside as the processed image data at a second frame rate.

2. The imaging element according to claim 1, wherein the first frame rate is a frame rate higher than the second frame rate.

3. The imaging element according to claim 1, wherein the second captured image data is image data obtained earlier by more than or equal to one frame than the first captured image data obtained by imaging.

4. The imaging element according to claim 1, wherein the degree of difference relates to a difference between the first captured image data and the second captured image data in units of lines, each time the first captured image data is read out in the units of lines by a reading portion.

5. The imaging element according to claim 1, wherein the degree of difference relates to a difference in predetermined high-order bit between the first captured image data and the second captured image data.

6. The imaging element according to claim 5,
wherein the first captured image data and the second captured image data are image data having a same number of bits,
the compressed image data is image data of a second bit less than a first bit that is the number of bits of the first captured image data, and
the predetermined high-order bit is a bit corresponding to a value obtained by subtracting the second bit from the first bit.

7. The imaging element according to claim 1,
wherein the compressed image data is data based on one piece of bit image data that is decided in accordance with the degree of difference among a plurality of pieces of bit image data obtained by dividing the first captured image data into the plurality of bit ranges.

8. The imaging element according to claim 7,
wherein the plurality of pieces of bit image data are high-order bit image data and low-order bit image data, and
the compressed image data includes data based on the high-order bit image data in a case where the degree of difference satisfies a predetermined condition, and includes data based on the low-order bit image data in a case where the degree of difference does not satisfy the predetermined condition.

9. The imaging element according to claim 7,
wherein a bit of a part of the compressed image data is a bit to which bit image specifying information capable of specifying any bit image data on which data of the compressed image data is based among the plurality of pieces of bit image data is assigned.

10. The imaging element according to claim 1,
wherein the compressed image data is image data in units of lines and includes divided image specifying information capable of specifying any divided image data on which data of the compressed image data is based among a plurality of pieces of divided image data obtained by dividing the first captured image data into the plurality of bit ranges.

11. The imaging element according to claim 1,
wherein in a case where imaging for a motion picture is started, the output circuit outputs the first captured image data to the outside before the second captured image data is stored in the memory.

12. The imaging element according to claim 1,
wherein in a case where imaging for a motion picture is started, the output circuit outputs data based on image data belonging to a specific bit range in the first captured image data to the outside before the second captured image data is stored in the memory.

13. The imaging element according to claim 1,
wherein in a case where imaging for a motion picture is started, the output circuit outputs substituting compressed image data to the outside in accordance with a degree of difference between the first captured image data and predetermined image data as image data substituting the second captured image data, before the second captured image data is stored in the memory, the substituting compressed image data being obtained by compressing the first captured image data by dividing the first captured image data into the plurality of bit ranges.

14. The imaging element according to claim 1,
wherein in a case where imaging for a still picture is consecutively performed at a predetermined time interval, the output circuit outputs the first captured image data or image data belonging to a predetermined bit range in the first captured image data to the outside before the second captured image data is stored in the memory, and outputs the compressed image data to the outside on a condition that the second captured image data is stored in the memory.

15. The imaging element according to claim 1,
wherein the imaging element is a laminated imaging element that includes a photoelectric conversion element and in which the photoelectric conversion element is laminated with the memory.

16. An imaging apparatus comprising:
the imaging element according to claim 1; and
a display processor that performs a control for displaying, on a display, an image based on the compressed image data output by the output circuit included in the imaging element.

17. An image data processing method of an imaging element in which a memory, an image processing circuit, and an output circuit are incorporated, the image data processing method comprising:
storing captured image data obtained by imaging a subject at a first frame rate by the memory;
performing processing on the captured image data by the image processing circuit;
outputting at least one of the captured image data or processed image data obtained by performing the processing on the captured image data to an outside of the imaging element by the output circuit;
generating, by the image processing circuit, in accordance with a degree of difference between first captured image data obtained by imaging and second captured image data stored in the memory, compressed image data obtained by compressing the first captured image data by dividing the first captured image data into a plurality of bit ranges; and
outputting the compressed image data generated by the image processing circuit to the outside as the processed image data at a second frame rate by the output circuit.

18. A non-transitory computer-readable storage medium storing a program for causing a computer to function as
an image processing circuit and an output circuit included in an imaging element in which a memory, the image processing circuit, and the output circuit are incorporated,
wherein the memory stores captured image data obtained by imaging a subject at a first frame rate,
the image processing circuit performs processing on the captured image data,
the output circuit outputs at least one of the captured image data or processed image data obtained by performing the processing on the captured image data to an outside of the imaging element,
the image processing circuit generates, in accordance with a degree of difference between first captured image data obtained by imaging and second captured image data stored in the memory, compressed image data obtained by compressing the first captured image data by dividing the first captured image data into a plurality of bit ranges, and
the output circuit outputs the compressed image data generated by the image processing circuit to the outside as the processed image data at a second frame rate.

\* \* \* \* \*